US011513864B2

(12) United States Patent
Koppes et al.

(10) Patent No.: US 11,513,864 B2
(45) Date of Patent: Nov. 29, 2022

(54) ADOPTION OF EXISTING VIRTUAL COMPUTING RESOURCES INTO LOGICAL CONTAINERS FOR MANAGEMENT OPERATIONS

(71) Applicant: Amazon Technologies, Inc., Seattle, WA (US)

(72) Inventors: Samuel Koppes, Bothell, WA (US); Daryl Stephen Cooke, Lake Forest Park, WA (US); Julio Cesar dos Santos Lins, Seattle, WA (US); Bharath Swaminathan, Issaquah, WA (US); Sayali Suhas Deshpande, Seattle, WA (US); Anthony Quigley, Seattle, WA (US); Romit Palit, Seattle, WA (US); Andrew John May, Seattle, WA (US); Courtney Ann Todd Campbell, Seattle, WA (US); Santosh Kalyankrishnan, Seattle, WA (US); Diane Diaz, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 394 days.

(21) Appl. No.: 15/933,184

(22) Filed: Mar. 22, 2018

(65) Prior Publication Data

US 2019/0294477 A1 Sep. 26, 2019

(51) Int. Cl.
*G06F 9/455* (2018.01)
*G06F 9/50* (2006.01)
*H04L 41/084* (2022.01)

(52) U.S. Cl.
CPC .......... *G06F 9/5077* (2013.01); *G06F 9/5072* (2013.01); *G06F 9/45558* (2013.01); *G06F 2209/5011* (2013.01); *H04L 41/0843* (2013.01)

(58) Field of Classification Search
CPC ..................... G06F 9/5077; G06F 2009/45562
See application file for complete search history.

(56) References Cited

U.S. PATENT DOCUMENTS 9,256,452 B1    2/2016  Suryanarayanan et al.
10,572,236 B2 *  2/2020  Chase ....................... G06F 8/71
(Continued)

OTHER PUBLICATIONS

Hummer, Waldemar, et al. "Testing idempotence for infrastructure as code." Dec. 9, 2013. ACM/IFIP/USENIX International Conference on Distributed Systems Platforms and Open Distributed Processing. Springer, Berlin, Heidelberg. (Year: 2013).*

(Continued)

*Primary Examiner* — Kenneth Tang
(74) *Attorney, Agent, or Firm* — Nicholson De Vos Webster & Elliott LLP

(57) ABSTRACT

A resource management system of a computing resource service provider performs adoptions of virtual resource instances, such as virtual machine instances and virtual data store instances that were not instantiated as members of a logical container, into logical containers that are used to manage members of the logical containers as a group. Adopting such "candidate" resources that were not generated from programmable infrastructure templates allows the resources to be managed in accordance with an infrastructure-as-code framework, alongside resources that are generated from such templates. A template for launching infrastructure instances may be modified to include an adopted resource definition describing the configuration of the adopted resource, so that management operations can be performed on the adopted resource together with the other members of the container. The system can generate an adopted resource definition from metadata of the adopted resource, to be included in the template or to validate the template.

20 Claims, 18 Drawing Sheets

(56) References Cited

U.S. PATENT DOCUMENTS

| | | | |
|---|---|---|---|
| 10,592,068 B1* | 3/2020 | Sedky | G06F 9/468 |
| 2008/0163171 A1* | 7/2008 | Chess | G06F 9/5077 |
| | | | 717/120 |
| 2011/0320605 A1 | 12/2011 | Kramer et al. | |
| 2013/0332920 A1 | 12/2013 | Laor | |
| 2014/0068032 A1* | 3/2014 | Kannan | H04L 61/20 |
| | | | 709/221 |
| 2014/0207918 A1* | 7/2014 | Kowalski | G06F 11/0709 |
| | | | 709/220 |
| 2014/0249927 A1* | 9/2014 | De Angelo | G06Q 30/0269 |
| | | | 705/14.64 |
| 2014/0282433 A1* | 9/2014 | Eilam | G06F 11/3676 |
| | | | 717/131 |
| 2014/0331226 A1* | 11/2014 | Arcese | G06F 9/45558 |
| | | | 718/1 |
| 2014/0365668 A1 | 12/2014 | Jaisinghani et al. | |
| 2016/0004551 A1* | 1/2016 | Terayama | G06F 9/45558 |
| | | | 718/1 |
| 2016/0164723 A1 | 6/2016 | Cimprich et al. | |
| 2017/0026416 A1* | 1/2017 | Carpenter | H04L 41/0866 |
| 2017/0041189 A1* | 2/2017 | Aswathanarayana | |
| | | | H04L 41/0843 |
| 2017/0339013 A1* | 11/2017 | Allen | H04L 41/0816 |
| 2018/0203680 A1* | 7/2018 | Nakanoya | G06F 9/48 |
| 2018/0309624 A1* | 10/2018 | Hilliard | H04L 41/0803 |
| 2018/0331927 A1* | 11/2018 | Eberlein | H04L 41/22 |
| 2019/0042320 A1* | 2/2019 | Prince | G06F 9/5077 |
| 2019/0065170 A1* | 2/2019 | Lipchuk | G06F 8/36 |
| 2019/0079750 A1* | 3/2019 | Foskett | G06F 8/71 |
| 2019/0079751 A1* | 3/2019 | Foskett | G06F 9/5072 |
| 2019/0205408 A1* | 7/2019 | Chen | G06F 11/0709 |

OTHER PUBLICATIONS

Morris, Kief. "Infrastructure as code: managing servers in the cloud". 2016. O'Reilly Media, Inc. (Year: 2016).*

Sandobalin, Julio et al. "End-to-End automation in cloud infrastructure provisioning." 2017. (Year: 2017).*

International Preliminary Report on Patentability, PCT App. No. PCT/US2019/023388, dated Oct. 1, 2020, 10 pages.

International Search Report and Written Opinion, PCT App. No. PCT/US2019/023388, dated Jun. 18, 2019, 11 pages.

* cited by examiner

FIG. 7D

ADOPTION OF EXISTING VIRTUAL COMPUTING RESOURCES INTO LOGICAL CONTAINERS FOR MANAGEMENT OPERATIONS

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies may allow a single physical computing device to host one or more instances of virtual computing resources, such as virtual machines that appear and operate as independent computing devices to users of a data center. The single physical computing device can create, maintain, delete, or otherwise manage virtual resources in a dynamic manner. In some scenarios, various virtual machines may be associated with different combinations of operating systems or operating system configurations, virtualized hardware and networking resources, and software applications, to enable a physical computing device to provide different desired functionalities, or to provide similar functionalities more efficiently.

In turn, users can request computer resources from a data center, including single computing devices or a configuration of networked computing devices, and be provided with varying numbers of virtual machine resources. Virtualization also scales upward from virtual machines; entire data centers and even multiple data centers may implement computing environments with varying capacities, such as a virtual private network and a virtual private "cloud" computing environment. A network of hardware computing devices can cooperatively use virtualization technologies to provide virtual computing resources and computing services to users of a computing resource service provider. Access to resources and data can be tightly controlled by a user account owner, an administrator, a group, a service, or the computing resource service provider itself; access can be based on many different parameters, such as user credentials, resource attributes, network configurations, and the like.

The provision of virtual computing resources as discrete instances configured for use as if they were typical data center hardware components, such as servers, disk storage, and network adapter cards, is known as infrastructure as a service (IaaS). An IaaS provider can also provide backend computing architecture implementing computing resources and services for, among other things, billing and account management, networking support such as monitoring and load balancing, security, backup and redundancy, and resource configurations and interoperability frameworks. A user can invoke these resources and services to create workflows, automate tasks, monitor and update deployed infrastructure, and otherwise manage its computing resources. An IaaS framework can enable a user to manage its infrastructure programmatically, a concept known as infrastructure as code (IaC). The "code" in IaC is machine-readable instructions organized as discrete definitions for each infrastructure component; the provider's virtual resource management service executes the instructions to rapidly provision, configure, and deploy instances of a virtual computing resource. IaC automates infrastructure deployment and combats configuration drift by conforming virtual resource instances to the corresponding definition.

BRIEF DESCRIPTION OF THE DRAWINGS

Various techniques will be described with reference to the drawings, in which:

FIGS. 7A-D are diagrams representing screenshots of a graphical user interface that prompts a user to enter information for performing resource adoption, in accordance with the present disclosure;

DETAILED DESCRIPTION

Figure 1:
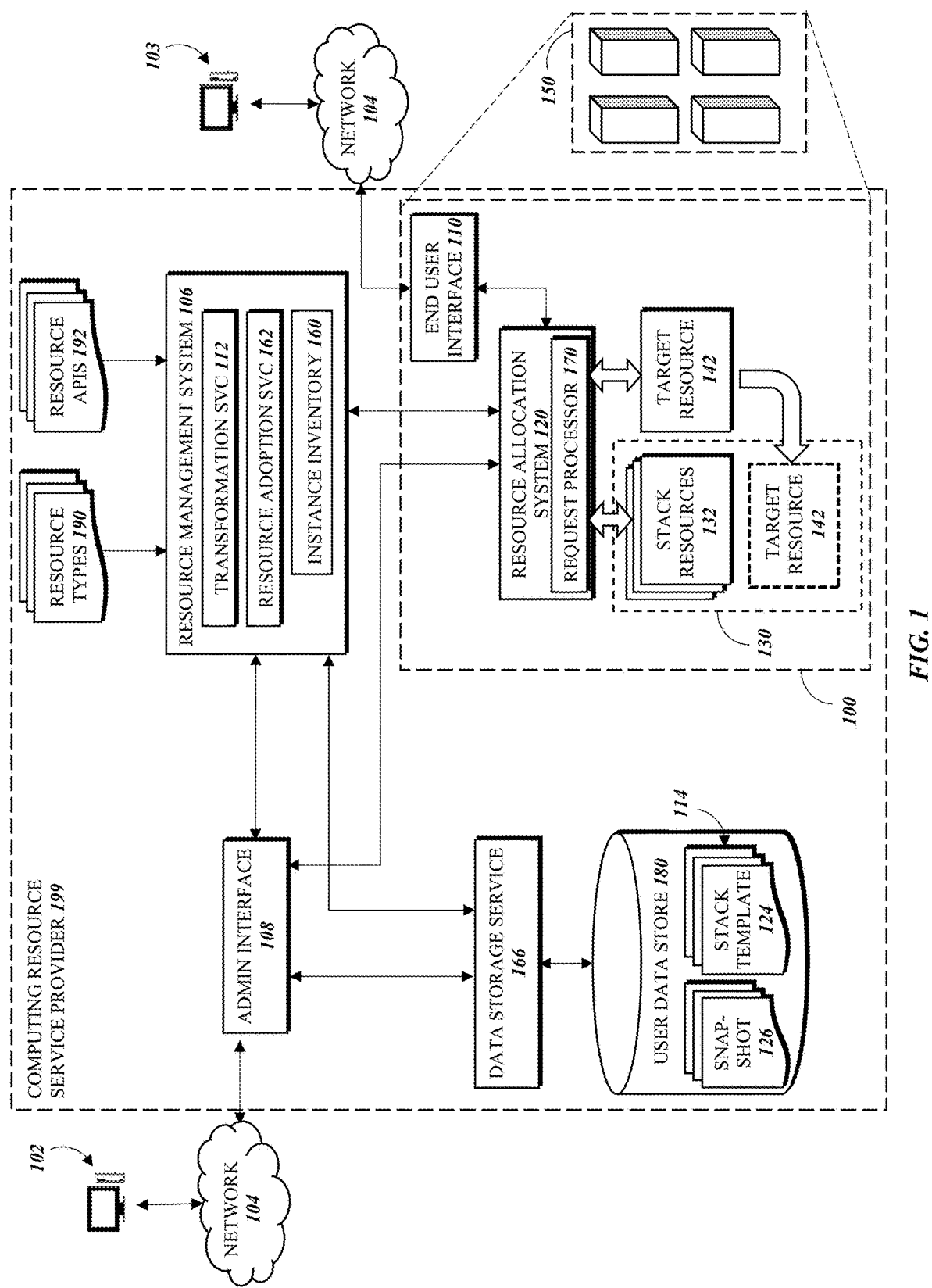
FIG. 1 is a diagram of a computing environment of a computing resource service provider, in which various embodiments of the present systems and methods can be implemented in accordance with this disclosure.

In the context of a computing resource service provider, a client makes requests to have computing resources of the computing resource service provider allocated for the client's use. One or more services of the computing resource service provider receive the requests and allocate physical computing resources, such as usage of a computer processor, memory, storage drives, computer network interfaces, and other components of a hardware computing device, to the client. In some computing systems, a virtualization layer of the computing system generates instances of "virtual" computing resources that represent the allocated portion of corresponding physical computing resources. In this infrastructure as a service (IaaS) environment, the client may operate and control, as its own computing infrastructure, instances of virtual computing resources, including without limitation: virtual machine instances each emulating a complete computing device having an operating system, processing capabilities, storage capacity, and network connections; virtual machine instances or other containers for performing specific processes; virtual network interfaces each enabling one or more virtual machine instances to use an underlying network interface controller in isolation from each other; virtual data stores operating like hard drives or databases; and the like. The computing resource service provider may provision the virtual computing resources to the client in the client's own virtual computing environment(s), which can be communicatively isolated (or restricted, e.g., via security policies) from the environments of other clients. The computing resource service provider may allow the client to configure its virtual computing resources, so they can receive connections from the computing devices of end users; the client's virtual computing resources can provide software applications, web services, and other computing services to the end users.

One or more services of the computing resource service provider may, as described further below, be responsible for allocating a virtual computing resource, configuring the virtual computing resource, and deploying the virtual computing resource into the client's virtual computing environment. An IaaS environment that implements infrastructure as code (IaC) concepts enables this resource management service to obtain a resource definition comprising program code, and interpret and execute the resource definition to identify the resource type, allocate the appropriate virtualized physical resources for a virtual resource instance of the corresponding type, apply a defined configuration to the virtual resource instance, and deploy the virtual resource instance into the virtual computing environment. Virtual computing resources are deployed into a client's virtual computing environment by creating the instance within corresponding resources allocated to the environment and connecting the instance to other virtual computing resources and sometimes also to computing networks that interface with end user devices. In one implementation, the virtualization layer (e.g., containing one or more hypervisors) of the computing system generates one or more virtual networks within the environment, and a new instance receives an address (e.g., an IPv4 address) on the virtual network and can then communicate with other components on the virtual network. The virtual network may be attended by physical or virtual networking components such as network interfaces, firewalls, load balancers, and the like, which implement communication protocols, address spaces, and connections between components and to external communication networks (e.g., the internet and other wide-area networks). In various implementations, a client can configure various aspects of the virtual network and its attendant components.

A client may create a configuration template that includes one or more IaC resource definitions. A template can be used to normalize resource definitions, such as by formatting the definitions to be read by the resource management service; format specifications may include programming language, schema, libraries, application programming interfaces (APIs), and other data sources to use to enable the resource management service to execute the resource definition's program code. A template may define a particular class of virtual computing resources. For example, a "web server" configuration template may include parameters that have default and/or customizable values; a virtual machine instance adopts these parameters to operate as a web server within the client's virtual computing environment. The client may configure requests that specify the class of virtual machine instance as "web server," and the resource allocation system that processes the request may interpret the web server configuration template to "spin up" new virtual machine instances as web servers that have the same parameters.

Additionally or alternatively, a template can be used to define a logical container, referred to interchangeably herein as a "stack," containing the resource definitions of multiple virtual computing resources that the client wants to subject to some common management operations. In various embodiments, a logical container can include definitions for multiple different types of resources, and/or for multiple configurations of the same type of resource, and/or for multiple instances of the same configuration of a resource; resources in the same stack may be configured to interface with each other, but this is not required. In various examples, the resources in a stack cooperate to provide the infrastructure for an end-to-end computing solution, such as a server or database application. In one particular example, the stack definition may include resource definitions for: a virtual machine to be configured as a web server having a popular blogging software application installed thereon; an SQL database to be mounted to the web server as local storage; and, a security group to be applied to the web server to allow public device connections over port 80 and secure connections over port 22, and to deny all other connections. The template may be used to automate deployment of identical stacks of the resources, making the application scalable and the user experience consistent.

Instantiating resources within a logical container allows the user, and other provider services, to manage the corresponding resource instances as a single unit. In various embodiments, the virtual resource instances may be created, updated, and/or deleted by creating, updating, or deleting a stack instance. In some embodiments, all virtual resource instances must be created or deleted successfully for the stack to be created or deleted; if, for example, a virtual resource instance fails to be created, the system may "roll back" the stack by automatically deleting any stack resources that have already been created, and undoing any other actions associated with creating the stack. Other instance lifecycle management operations may be efficiently performed using stacks, some of which are described further below.

In some computing environments, IaC design may be enabled but not mandated. A client's virtual computing environment can evolve into a fragmented state, where some virtual resource instances belong to stacks instantiated from IaC resource definitions, and some virtual resource instances, referred to herein as "candidate" or "target" resources, were configured and deployed using other configuration tools and do not belong to a stack. This state is generally not favorable, possibly requiring duplication of effort, special attention to candidate resources due to their unique configuration, and use of different management consoles; additionally, scalability and distribution of updates are adversely affected. For at least these reasons, once IaC design is used for some of the client's infrastructure, it is preferable to use IaC for ALL of the infrastructure.

In IaC, the template containing the resource definitions is the "source of truth" for the stack: create, update, and delete operations are all performed by executing the template's program instructions. Unfortunately, therefore, an existing candidate resource cannot simply be "adopted" into a new or existing stack because it does not have a corresponding resource definition in the stack template. Assuming the candidate resource can be described using the stack template's programming language and schema, a corresponding resource definition could be created and added to the stack template. There are two main problems with this. First, as the complexity of the candidate resource's configuration increases, so do the complexity of the corresponding resource definition and the likelihood of a coding error. Validation of the resulting resource definition is essential before attempting management operations based on the resulting stack template.

Moreover, even if the candidate resource is accurately captured by an adopted resource definition in the stack template, executing a stack operation will not adopt the candidate resource into the stack. Instead, the create or update operation creates a new resource instance in the stack from the adopted resource definition. The new instance cannot have the same identifiers as the candidate resource, so identical connections to other resources cannot be created. In the end, for previous systems, the user can only adopt an candidate resource into a stack by deleting the original instance and re-creating the candidate resource as an adopted resource using a stack creation or update operation. For some resources this is acceptable, but others may be difficult to recreate, may bear a high risk of data loss, or may be critical to supporting ongoing live traffic flows. These cannot be deleted, and in some cases cannot be modified or interfered with in any way, but it can be advantageous to adopt them into a stack.

The present disclosure provides systems and methods for performing adoption of target candidate resources of a virtual computing environment (VCE) into a new or existing logical container, in order to manage the adopted resources as a unit with other virtual computing resources in the logical container. For clarity of description, the logical containers in the present systems will be referred to as "stacks," though the term stack is not intended to suggest any structural relationship between the resources within the stack, nor does the term necessitate any relationship between the resources beyond their being grouped together logically (as in the examples described below) in order to control the resources as a unit. In some cases, instances of a virtual computing resource belonging to the stack are launched by launching the stack. The stack may have an associated configuration template, and the resource management system uses the identified template to set the initial configuration of a new instance for each of the stack's virtual computing resources, and to prepare the new instances for deployment. An executing stack may therefore include one or more virtual resource instances executing in an execution environment of the VCE of a user. Changes to an existing stack may be made by changing the stack template and then executing an update command, causing the resource management system to determine the changes that have been made, and to update or re-create (by executing the modified template) only those virtual resource instances that are affected by the changes.

The instances may each have a resource type associated with a virtual computing resource, an operational resource, a security group, a security policy, or any other resource having a type that is understood within the VCE and/or by a resource management system of a computing resource service provider that provides the VCE. The parameters of the resource type, together with the formatting requirements (e.g., programming language, schema) of the stack template, determine the form and substance of each resource definition contained in the stack template and corresponding to one of the stack's resources. In various embodiments, each candidate resource to be adopted into a stack may also have a resource type that is understood by the VCE and/or the resource management system. As such, the candidate resource can be described by a resource definition that is compatible with the stack template. This adopted resource definition (ARD), in accordance with the present disclosure, may be configured so that the corresponding program instructions, when executed together with the rest of the stack template, cause the resource management system to logically associate the candidate resource with the stack, effectively adopting the candidate resource into the stack without making any changes to the candidate resource.

The ARD(s) may be incorporated into the stack template to produce an adoptive template that causes the system to create or update the stack to include the target (now adopted) resources. In some embodiments, a user of the user account associated with the VCE, or the user's agent, may create an ARD for each of the target resources to be adopted into the stack, and/or may integrate the ARD(s) into the stack template. The user may itself produce the ARDs, or may invoke a transformation service of the system to produce the ARDs and/or modify the stack template. In one embodiment, an ARD may include a logical identifier (i.e., a name) that identifies the corresponding target resource within the adoptive template; the ARD may further include a physical identifier, which corresponds to a primary identifier of the candidate resource (e.g., an instance identifier for a virtual machine instance) that identifies the candidate resource within the VCE. The ARD may further include adoption data describing the association of the candidate resource with the stack, as well as all of the parameters (e.g., properties, outputs) needed to describe the configuration of the candidate resource.

Assuming the appropriate permissions are granted, the system may communicate with a target resource to facilitate the adoption process. In some embodiments, the system may communicate with the target resource as part of a template validation process, whereby the system determines whether the corresponding ARD accurately describes the target resource. Additionally or alternatively, the system (e.g., a transformation service thereof) may communicate with the target resource as part of a template creation process, whereby the system generates the corresponding ARD and incorporates it into the stack template. In one example, the system may use an API corresponding to the resource type of the candidate resource to access the candidate resource and obtain data describing the candidate resource. The data may comprise metadata, including key/value pairs for some or all of the candidate resource's configuration parameters; the system may obtain this metadata without interrupting operations of, or making changes to, the candidate resource.

The system may parse the collected data into the key/value pairs that are needed to produce a corresponding ARD, and may store the identified pairs in a data store as a "snapshot" of the candidate resource's parameters. After the snapshot is created, the system may obtain the snapshot and interpret its key/value pairs, e.g., using the API of the resource type to identify defined variables, and using the stack template's formatting rules, to transform the key/value pairs into program instructions that form the ARD. If the system is validating the ARDs already in the template, the system may compare its generated definition to the stored definition in the template to identify any differences; no differences indicates that the template's ARD is valid, and if there are differences, the system may roll back launch of the stack and notify the user of an input error. Additionally or alternatively, the system may deliver its generated ARD(s) to the user with instructions for the user to incorporate the ARD(s) into the stack template, or may automatically itself incorporate the ARD(s) into the stack template, to produce the adoptive template.

Systems and methods are described for performing several variations of resource adoption and anti-adoption using IaC resource definitions and other template modifications described herein. The system can add one or more target resources to a new stack (i.e., having a stack template with newly defined computing resources that will be launched—provisioned, configured, and deployed—as members of the stack), or to an existing (i.e., executing) stack. The system can create a new stack including only the target resources. The system can receive an identifier for a target resource or multiple identifiers of target resources, or the system can "discover" candidate resources (e.g., by determining which executing instances are not associated with a stack) and select all or a subset of them, or present them to the user (i.e., via a user interface) for selection. The system can detach previously adopted resources from a stack, so that they are "orphaned" and do not belong to any stack, or the system can restack the detached resources by adding them to another stack.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

Referring to FIG. 1, embodiments of the present disclosure may operate within or upon computing systems of a computing resource service provider 199 accessible by users of user computing devices 102, 103 via a computer network 104 such as the internet. In particular, a "client," or administrator of the virtual computing resources to be deployed, may access the computing systems of the computing resource service provider 199 (e.g., using the client's user account credentials) using a computing device 102 to connect to a first user interface 108; an end user may access the client's virtual computing resources using a computing device 103 to connect to a second user interface 110 or another endpoint that connects to the computer network 104. The user interfaces 108, 110 may be websites, web applications, command consoles, and the like, as described further below.

The computing resource service provider 199 implements at least one virtual computing environment 100 in which users may obtain virtual computing resources that enable the users to run programs, store, retrieve, and process data, access services of the computing resource service provider 199, and the like. The virtual computing environment 100 may be one of any suitable type and/or configuration of a compute resource virtualization platform implemented on one or more physical computing devices. Non-limiting examples of virtual computing environments 100 include data centers, clusters of data centers organized into zones or regions, a public or private cloud environment, and the like.

The virtual computing environment 100 may be associated with and controlled and managed by the client (e.g., via the user interface 108). In some embodiments, the virtual computing environment 100 of a particular client may be dedicated to the client, and access thereto by any other user of the computing resource service provider 199 prohibited except in accordance with access permissions granted by the client, as described in detail herein.

The computing resource service provider 199 may include data processing architecture that implements systems and services that operate "outside" of any particular virtual computing environment and perform various functions, such as managing communications to the virtual computing environments, providing electronic data storage, and performing security assessments and other data analysis functions. These systems and services may communicate with each other, with devices and services outside of the computing resource service provider 199, and/or with the computing environments. It will be understood that services depicted in the Figures as inside a particular virtual computing environment 100 or outside all virtual computing environments may be suitably modified to operate in the data processing architecture in a different fashion that what is depicted.

In general, the user computing devices 102, 103 can be any computing device such as a desktop, laptop, mobile phone (or smartphone), tablet, kiosk, wireless device, and other electronic devices. In addition, the user computing devices 102, 103 may include web services running on the same or different data centers, where, for example, different web services may programmatically communicate with each other to perform one or more techniques described herein. Further, the user computing devices 102, 103 may include Internet of Things (IoT) devices such as Internet appliances and connected devices. Such systems, services, and resources may have their own interface for connecting to other components, some of which are described below. Although one or more embodiments may be described herein as using a user interface, it should be appreciated that such embodiments may, additionally or alternatively, use any CLIs, APIs, or other programmatic interfaces.

A network 104 that connects a user device 102 to the computing resource service provider 199 may be any wired network, wireless network, or combination thereof. In addition, the network 104 may be a personal area network, local area network, wide area network, over-the-air broadcast network (e.g., for radio or television), cable network, satellite network, cellular telephone network, or combination thereof. In some embodiments, the network 104, may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

Accordingly, a user of a user device 102, 103 may access the computing resource service provider 199 via a user interface 108, 110, which may be any suitable user interface that is compatible with the user device 102, 103 and the network 104, such as an API, a web application, web service, or other interface accessible by the user device 102, 103 using a web browser or another software application, a command line interface, and the like. In some embodiments, the user interface 108, 110 may include code and/or instructions for generating a graphic console on the user device 102, 103 using, for example, markup languages and other common web technologies. The first, or administrative, interface 108 may, via the connecting device 102, present a user with various options for configuring, requesting, launching, and otherwise operating virtual computing resources in one or more of the computing environments 100. The second, or end user, interface 110 may, via the connecting device 103, present a user with static, dynamic, and/or interactive content processed and provided via virtual computing resources 132, 142 executing in the client's virtual computing environment 100. User input (e.g., text, computer files, selected elements from a list or menu, mouse clicks on buttons, and other interactions) entered into the user interface 108, 110 by the user may be received and processed by one or more components of the computing resource service provider 199, such as a resource management system 106, a data storage service 166, and/or one or more components in the computing environment 100, such as a resource allocation system 120.

For example, the client may use the user interface 108 to configure a virtual network, configure and launch (e.g., from a command line) virtual computing resources 142, create templates 114, 124 for instantiating logical containers 130 and virtual computing resources 132 and connecting them to the virtual network and/or the external communication network 104, and request snapshots 126 of a target resource 142 configuration as described below. Such processes may generate records describing the client's and/or end users' user accounts and store the user account records in a user data store 180. The records may include information indicating that an end user associated with the user account is authorized or approved to request and use virtual computing resources in the computing environment 100. The information may describe limitations on the end user's ability to use virtual computing resources. For example, user account information may specify the types of virtual computing resources the end user is allowed to request and/or the actions (e.g., read, write, copy) the end user is allowed to perform. In some embodiments, the templates 114 containing program code for launching programmable computing infrastructure (e.g., IaC) resources, including a stack template 124 modified as described below to adopt a target resource 142 into the associated stack 130, may be stored in the user data store 180. In some embodiments, a snapshot 126 comprising metadata obtained from the target resource 142, and used to generate a resource definition included in the stack template 124, may be stored in the user data store 180. A data storage service 166 of the computing resource service provider may manage queries, data transfers, and other data processing for the records in the user data store 180.

A computing environment 100 may be configured to provide compute resources to users that are authorized to use all or part of the computing environment 100. Compute resources can include, for example, any hardware computing device resources, such as processor computing power/capacity, read-only and/or random access memory, data storage and retrieval systems, device interfaces such as network or peripheral device connections and ports, and the like. In some embodiments, these resources may be dispersed among multiple discrete hardware computing devices (e.g., servers 150); these hardware computing devices may implement or communicate with a virtualization layer and corresponding virtualization systems (e.g., a hypervisor on a server), whereby the compute resources are represented by, and made accessible as, virtual computing resources. A virtual computing resource may be a logical construct, such as a data volume, data structure, file system, and the like, which corresponds to certain compute resources. Non-limiting examples of virtual computing resources include virtual machines and containers (as described below), logical data storage volumes capable of storing files and other data, software programs, data processing services, and the like.

The computing environment 100 may be configured to allocate compute resources of corresponding hardware computing devices by virtualizing those resources to produce a fixed or variable quantity of available virtual computing resources. The available resources may be provided in a limited manner to one or more users that submit requests for virtual computing resources within the computing environment 100; virtual computing resources that are allocated to and/or in use by a particular user are represented by stack resources 132 and target resource 142. Various functions related to processing requests to use virtual resources, to otherwise managing the allocation and configuration of the available resources and allocated virtual resources, and to limiting the amount of virtual resources that are allocated to a particular user in accordance with the present systems, may be performed by one or more services executing within the computing environment 100 and/or outside of it (i.e., in the data processing architecture of the computing resource service provider 199).

In some embodiments, as illustrated in FIG. 1, a resource allocation system 120 operating within the computing environment 100 may cooperate with a resource management system 106 implemented outside of the computing environment 100 to manage the allocation of virtual resources and configuration and deployment of the virtual resources as virtual resource instances. In some embodiments, the resource allocation system 120 receives at least the communications that contain requests, commands, instructions, and the like (collectively herein, "requests"), to allocate, launch, execute, run, or otherwise provide, for use by an identifiable user (e.g., the requesting user or another specified user), one or more virtual computing resources in the computing environment 100. In various embodiments, these communications are sent to the resource allocation system 120 by any user or by the resource management system 106. A request received by the resource management system 106 may be generated directly by the client (e.g., using the user interface 108) or by the resource allocation system 120, or the request may be generated as, or in response to, an output (e.g., a trigger event message) of another component of the computing resource service provider 199 or of an external device.

The resource allocation system 120 may include one or more services, implemented in software or hardware devices, for performing pertinent tasks. In some embodiments, the resource allocation system 120 may include a request processor 170 which is configured by executable program instructions to receive a request for virtual computing resources, parse the request into delivery and other parameters, determine whether the request can be fulfilled based on the available resources, the requestor's credentials, and other parameters, and if the request can be fulfilled, provide a virtual computing resource configured for use according to the parameters of the request. The request processor 170 may additionally be configured to send the request, or some or all of the data contained in the request or describing the request, to the resource management system 106 for associated processing as described herein. The request processor 170 or another component of the resource allocation system 120 may be configured to send to the user interface 108 information related to processing the request, such as error, completion, and other status messages.

The resource allocation system 120 may additionally collect and/or generate usage data describing aspects of virtual computing resources 132, 142 executing in the virtual computing environment 100. Non-limiting examples of such usage data may include: configuration and/or status parameters of the target resource 142 at the time of launch or failure to launch; information related to the processing of a request to use virtual computing resources; monitoring data collected by monitoring target resource 142 operations, such as network communications, data storage and retrieval and other disk access operations, execution of software programs, and the like; and, state data such as a snapshot of the state of the virtual computing resource 142 at the time it is provisioned, deploys, terminates, fails, or generates an error, or at any other time. The usage data may be sent to the resource management system 106, or the resource management system 106 may, by default or by user authorization, obtain the usage data from the resource allocation system 120 or from a data store.

The resource management system 106, among other operations, performs resource adoption tasks in accordance with a requested adoption operation. The resource management system 106 may further perform management operations on logical containers by applying the management operations to the members (e.g., stack resources 132) of an identified logical container (e.g., stack 130 in virtual computing environment 100). In some cases, the management operation and request for adoption of resources may be combined or otherwise associated with each other, such as when the resource management system is requested to update the stack 130 to include the target resource 142. The resource management system 106 may, in some embodiments, be a global (i.e., in communication with all computing environments of the computing resource service provider 199) system, and may be implemented in the data processing architecture of the computing resource service provider 199. For example, the resource management system 106 may be part of a control plane that processes some of all of the network communications going into and coming out of the computing environments. In other embodiments, the resource management system 106 may include one or more components, such as services, that are distributed within and across the computing environments. One or more component services, implemented in software or hardware, may perform the various discrete tasks described herein, or in some embodiments may cause them to be performed by other services. For example, in some embodiments the resource management system 106 may itself create snapshots 126 or transform templates 114, while in other embodiments the resource management system 106 may send requests to another service external to the resource management system 106 to perform these tasks. Additionally or alternatively, the resource allocation system 120 may perform some or all of the resource management system 106 tasks, as described further herein.

The resource management system 106 may include an instance inventory 160 storing records for each of the virtual resource instances managed by the resource management system 106. One example of an instance inventory 160 is a database or other structured data store, which may be contained in, or referenced by, memory of the resource management system 106 (e.g., a memory module of the server(s) implementing the resource management system 106). The records may be database records, metadata records, files, rows in a table, etc. The information in a record may include parameters of the associated virtual resource instance, such as an instance identifier (i.e., the physical identifier within the virtual computing environment 100) for the instance, a stack identifier of the stack the instance belongs to, a template identifier of the template used to launch or reference the instance, etc. In one embodiment, the instance inventory 160 may be a "master" inventory that tracks the virtual resource instances executing in all of the virtual computing environments of the computing resource service provider 199, while in other embodiments the instance inventory 160 may only track instances in the VCEs of a particular user or group of users, or only of a single VCE 100.

The resource management system 106 may include a resource adoption service 162 that performs the tasks associated with adopting one or more virtual resource instances into a logical container, and/or detaching one or more virtual resource instances from a logical container. Responsive to a request that identifies an adoption/detachment action for a logical container, such as stack 130, the resource adoption service 162 may identify the stack 130 and the target resource 142 (e.g., via identifiers contained in the action). The stack 130 may not yet be created in the VCE 100 (i.e., the adoption action is part of a management operation for creating the stack 130), or the stack 130 may already exist in the VCE 100 and may have, as its members, one or more stack resources 132 (i.e., the adoption action is part of a management operation for updating the stack 130). The resource adoption service 162 may obtain a template 124 that the requestor submits to be used as the "source of truth" for the stack 130 subsequent to the adoption action.

The stack template 124 may define the stack 130 using program code that can be interpreted by the resource management system 106 and/or the resource allocation system 120 to create and configure the stack 130. Similarly, the stack template 124 may include one or more resource definitions that define the stack resources 132 that are always instantiated, from program code, as members of the stack 130 when a new stack 130 is created; the resource definitions for stack resources 132 may further be used to perform updates of the corresponding instances as described further below. Additionally, the stack template 124 may include an adopted resource definition associated with the target resource 142. In some embodiments, the adopted resource definition may include a logical identifier used to identify the target resource 142 within the template 124 and the stack 130, and a physical identifier, used to identify the target resource 142 within the VCE 100, associated with the logical identifier. The adopted resource definition may further include information describing a configuration of the target resource 142. The adopted resource definition may be formatted in the format of the rest of the template, as described further below. Any of the templates 114, 124, as well as the adopted resource definitions may be written and uploaded by the client or another entity, but some program code generation tools for templates are described below.

If the stack 130 hasn't been created, or if the stack 130 exists and was created from a master template or an earlier version of the stack template 124, the stack template 124 may never have been executed or even tested. Generally, changes can be made to a template 114 that is the source of truth of resources such as a logical container and its members, and then the resource management system 106 may receive requests to test the changes and, if the changes are accepted, to update or recreate the resources that were changed. Thus, if the stack 130 creation or update operation succeeds, the resource adoption service 162 will associate the target resource 142 with the stack 130 as described below and save the stack template 124 as the new source of truth for the stack 130. The resource adoption service 162 may also validate an adopted resource definition that is added (e.g., by manual entry of the client) to the stack template 124. In one embodiment, the resource adoption service 162 may obtain a snapshot 126 of the target resource 142, transform the snapshot 126 into template program code, and compare the template program code to the adopted resource definition to identify any differences that indicate an error in the template 124.

In some embodiments, the resource management system 106 may use values for the management operation parameters that are supplied by the client or an administrator of the corresponding user account. For example, an API such as the administrator user interface 108 may present prompts (e.g., graphically on the user device 102) for the administrator to enter values for any suitable parameter; the administrator may enter the values, and the resource management system 106 may receive the values and use them immediately or store them, such as in a template 114 or another record in the user data store 180. Such parameters and their associated values may be used to identify, for example, a target resource 142 for adoption or detachment, or a logical container to receive the target resource 142.

The resource management system 106 may further include a transformation service 112 for transforming an identified template 114, 124 from its original form into a revised form that incorporates or eliminates adoption information, depending on the adoption action being performed or requested. A template 114, 124 may be a logical representation of virtual resources that can be instantiated in the virtual computing environment 100. A template 114, 124 may conform to a template language that the corresponding systems are configured to interpret. For example, a template 114, 124 may be a structured document written in an object-oriented programming language such as JavaScript Object Notation (JSON) or YAML. The transformation service 112 may be invoked to add program code to or delete program code from a template 114, 124. For example, the transformation service 112 may transform the stack template 124 to include a virtual resource definition for the target resource 142 adopted into the stack 130, as well as other adoption information such as program code associated a logical identifier of the stack template 124 with the physical identifier of the target resource 142. In another example, the adopted target resource 142 is requested to be detached from the stack 130, and the transformation service 112 removes the adoption information and the virtual resource definition from the stack template 124.

In some embodiments, the transformation service 112 may also create the virtual resource definition for the target resource 142. The transformation service 112 may begin to collect metadata from the target resource 142, comprising key/value pairs that describe the configuration of the target resource 142. The parameters collected from the metadata may be any of the resource properties needed to describe the target resource 142 in the stack template 124, including without limitation: resource type; virtualization type; computing architecture; security group and other security information; and, resource type-specific information. The transformation service 112 may have access to resource type definitions 190 for some or all of the resource types that are understood by services of the computing resource service provider 199. Knowing the resource type, the transformation service 112 may use the associated resource type definition 190 to obtain parameters that are specific to the resource type. For example, a virtual machine instance may provide its operating system, size and location of logical volumes, applications installed thereon, etc. The transformation service 112 may additionally or alternatively access one or more APIs 192 associated with the resource types; the transformation service 112 may identify the API 192 for the target resource 142 and use the API 192 to submit the correct requests to the target resource 142 for obtaining the configuration parameters and streaming them into a snapshot 126.

The transformation service 112 may then transform the snapshot 126 into a standalone template or a virtual resource definition formatted for insertion into a template. A resulting virtual resource definition may be expressed in a language independent format such as JSON or YAML. Examples discussed in this disclosure may be in JSON format or in a format similar to JSON and as illustrations of various embodiments which may be implemented. Of course, various other formats which may be utilized in the manner described in connection with JSON and JSON-like formats are also contemplated and within the scope of this disclosure. In various embodiments, the expression of the target resource 142 configuration is compatible with the formatting and program code of the stack template 124. The virtual resource definition may be returned to the client or stored for later retrieval and manual incorporation into the stack template 124. Alternatively, the transformation service 112 may automatically incorporate the virtual resource definition into the stack template 124.

In addition or alternatively to configuring, deploying, and managing a virtual network and compute resources of the virtual computing environment 100, the client may use the administrator user interface 108 to initiate the various resource adoption and/or detachment procedures described herein. Following are non-limiting examples of APIs that the user interface 108 may be or include to perform such procedures. A template creation API may enable the client to submit or program one or more templates 114 comprising virtual computing resource definitions and other parameters that the resource allocation system 120, and/or other systems of the computing resource service provider 199, use to allocate, configure, and deploy virtual computing resource instances into the virtual computing environment 100. In some embodiments, a template creation API may enable the client to generate a template 114 based on the configurations of virtual computing instances that are executing in the virtual computing environment 100 at that time. An example template is discussed below with respect to FIG. 3.

Similarly, a snapshot creation API may enable the client to initiate the creation of a snapshot 126. The client may provide an instance identifier or another physical identifier for the target resource 142, and may further provide operational parameters such as the associated logical identifier to be used for the virtual resource definition in the stack template 124, and/or the resource type 190 of the target resource 142. The client may be able to use the API to request a status of the snapshot 126, which may be "in progress," "failed," or "complete," for example. A template composition API may enable the client to transform a snapshot 126 into a template and/or into a virtual resource definition formatted like a template and ready to be incorporated into a template. The virtual resource definition may be returned to the client or stored for later retrieval and manual incorporation into the stack template 124. Alternatively, the template composition API or another component of the resource management system 106 may automatically incorporate the virtual resource definition into the stack template 124.

Figure 2A:
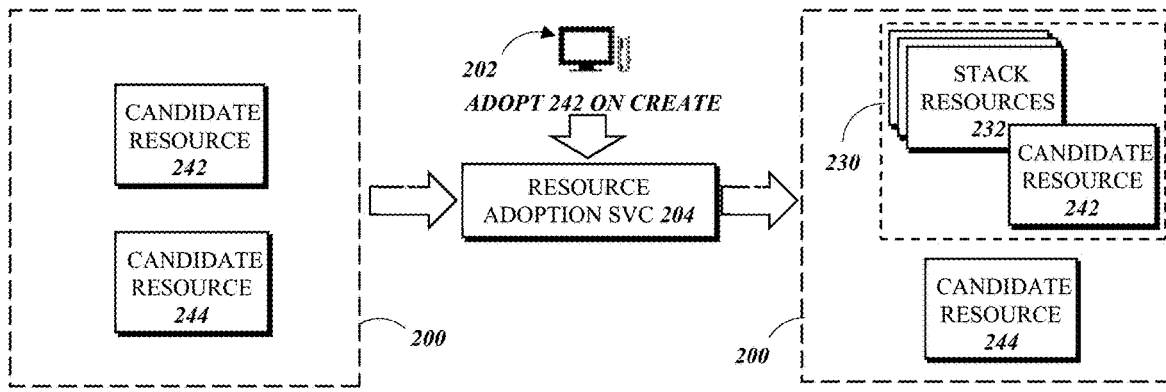
FIGS. 2A-E are diagrams of various resource adoption functions that can be performed by a resource adoption service, in accordance with the present disclosure.

FIGS. 2A-F present example operations of a resource adoption service 204 (which may be identical or similar to the resource adoption service 162 of FIG. 1, or may be entirely different) that receives, together with and/or separately from requests for stack management operations, requests to perform resource adoption actions from a client (via client computing device 202) on virtual computing resources associated with the client's VCE 200. FIG. 2A illustrates an example action of adopting a candidate resource 242 into a stack 230 when the stack 230 is first created in the VCE 200. In some embodiments, there may be multiple "candidate" resources which do not belong (i.e., are not members of) a logical container (e.g., stack 230) within the VCE 200. The request may identify the candidate resource 242, differentiated from another candidate resource 244 using an instance identifier, physical identifier, or other data elements. For example, the candidate resource 242 and candidate resource 244 may have the same physical identifier, and the request may identify one or more context keys to disambiguate the candidate resources 242, 244.

The template for the stack 230 may be created solely to include the virtual resource definition for the candidate resource 242, in some embodiments. However, as illustrated, the template may additionally include virtual resource definitions or other program code for one or more stack resources 232 that are programmable infrastructure resources instantiated using the template's program code. In contrast, the candidate resource 242 may not have been instantiated from the template, but the template is modified to include a virtual resource definition that adopts the candidate resource 242 into the stack 230, without deleting, changing, or interfering with the candidate resource 242, while enabling the launch of the stack resources 232. As shown, candidate resource 244, not referenced in the template of the stack 230, remains outside of the stack 230.

Figure 2B:
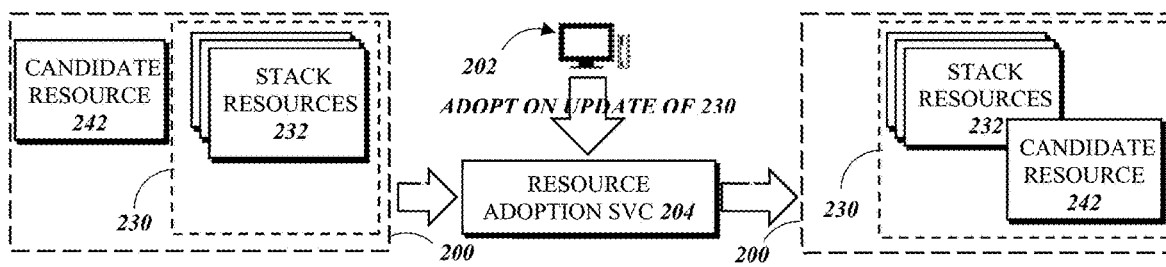

FIG. 2B illustrates an example action of adopting a candidate resource 242 into a stack 230 after the stack 230 has been created in the VCE 200; the resource adoption service 204 may, for example, receive the request for the action together with a management operation to update the stack 230. The virtual resource definition for the target 242 is added to a template that was previously used to launch the stack 230 and stack resources 232 in the VCE 200. After adoption, the management operations on the stack 230 are applied to the candidate resource 242 as well as the stack resources 232 as a unit.

Figure 2C:
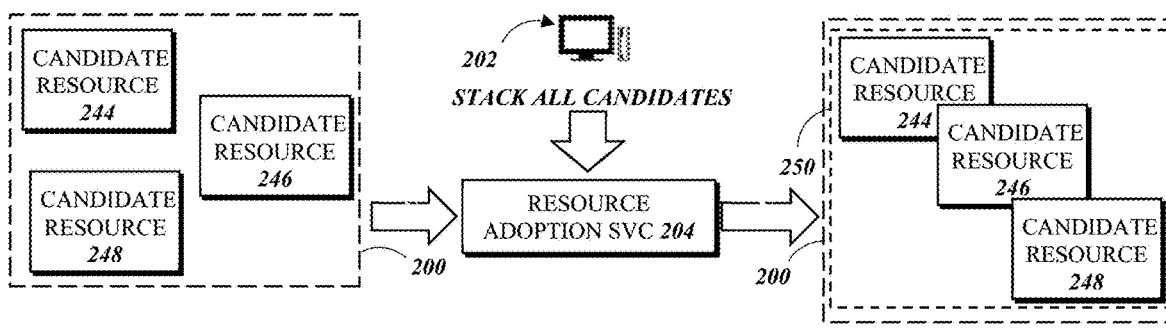

FIG. 2C illustrates an example "lasso" action in which all of the candidate resources 244, 246, 248 executing in the VCE 200 are identified, and a template for a new stack including all of the candidate resources 244-248 is created. The resource adoption service 204 executes the new template to launch a stack 250 in the VCE 200, including as its members the newly adopted candidate resources 244, 246, 248. After adoption, the management operations on the stack 250 are applied to the candidate resources 244-248 as a unit.

Figure 2D:
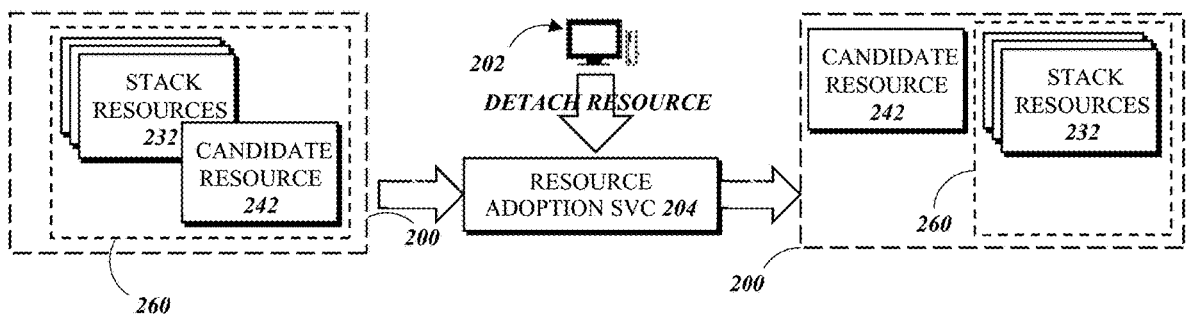
Figure 2E:
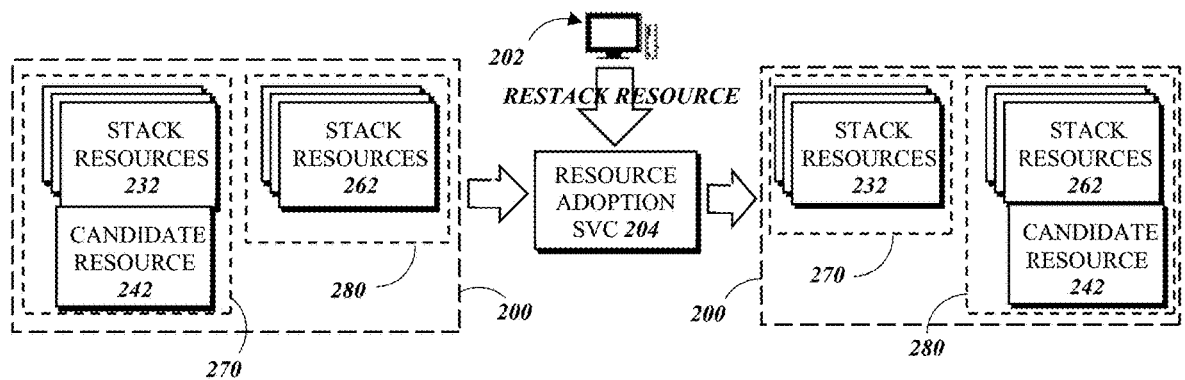

FIG. 2D illustrates an example action of detaching a previously adopted candidate resource 242 from its adoptive stack 260. In one embodiment, the template for the stack 260 may indicate which logical identifier is associated with the physical identifier of the candidate resource 242; the system may simply remove the virtual resource definition associated with the logical identifier, though other steps may be taken to detach the candidate resource 242 without disrupting the candidate resource 242 or the stack resources 232. For example, when the physical identifier of the candidate resource 242 is not stored in the template, the system may obtain a logical identifier in the template that corresponds to the ARD of the candidate resource 242, and may use the logical identifier to look up the physical identifier in a database or a metadata record, such as in an instance inventory as described below. In another example, the system may be configured to generate a status message for each of the resources in the stack 260 when the stack 260 is instantiated in the VCE 200; the status message for adopted resources such as the candidate resource 242 may indicate that the resource is adopted. The system may obtain the status messages and then obtain the physical identifier for any resource associated with a status message indicating adoption. In FIG. 2E, an example action of "restacking" a candidate resource 242 includes detaching the candidate resource 242 from a first stack 270 as described above with respect to FIG. 2D, and then adopting the candidate resource 242 into a second stack 280 as described above with respect to FIG. 2B.

Figure 3:
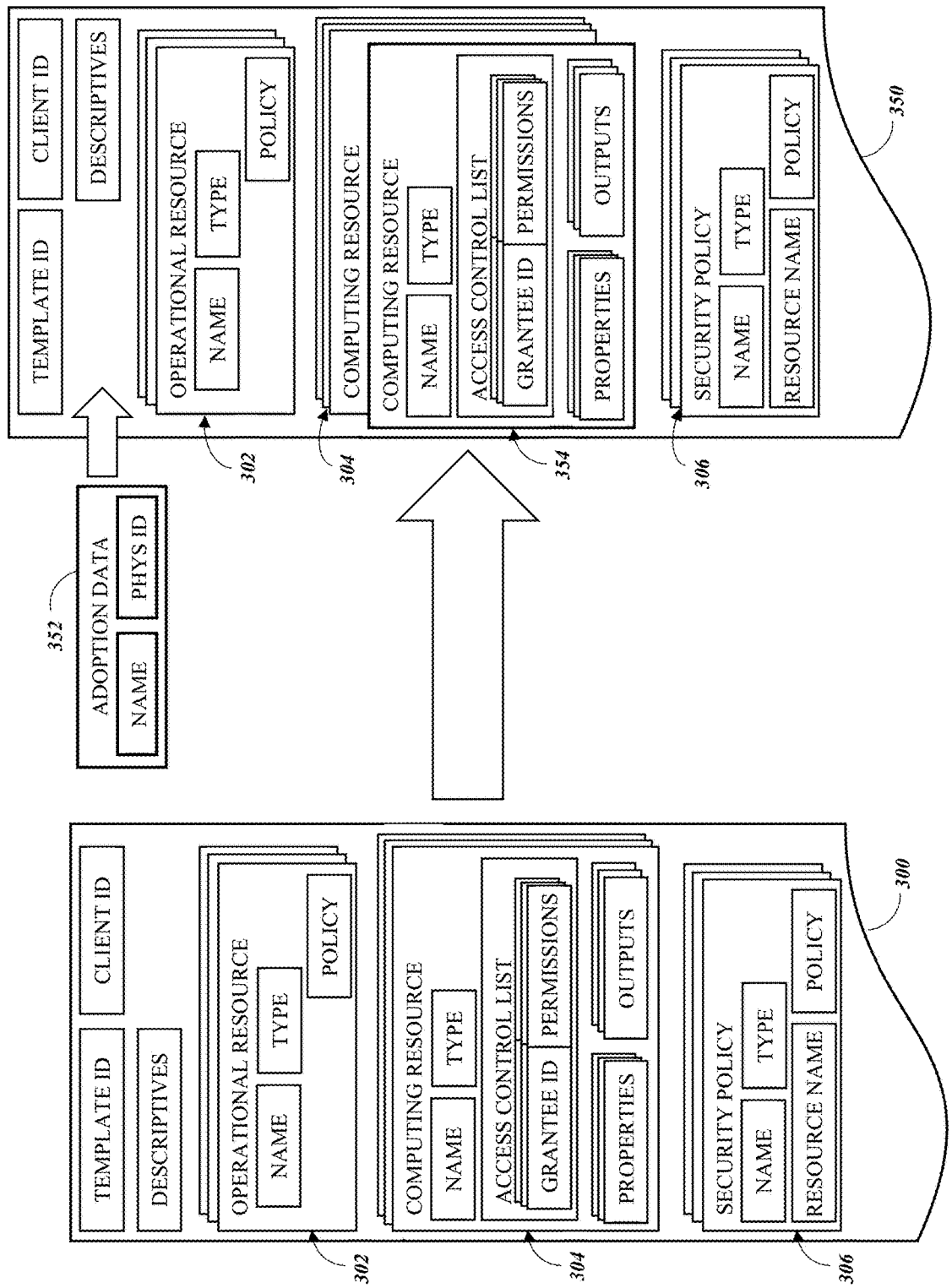
FIG. 3 is a diagram of example templates used to provision and deploy virtual computing resources.

FIG. 3 illustrates two example templates 300, 350. A first template 300 may be an example of the template 124 of FIG. 1 before the template 300 is updated to include information for adopting a resource; additionally, the template 300 represents the stack template 124 of FIG. 1 after an adopted resource has been detached from the associated stack. A template may have more or less information than the illustrated template 300; the following description provides some examples of resources that can be defined and launched using a template. A template 300 may include header information such as a template identifier, a user identifier for the user (i.e., client) who owns the template, and one or more fields containing descriptive information such as versioning and text describing what the template 300 is used for. One or more definitions 302, 304, 306 may be included in the template, and each may provide parameters to be included in the configuration of resources created and/or launched from the template 300. Non limiting examples of resource definitions include: an operational resource definition 302 including a name, a resource type (e.g., logical container; group scaling policy), and an access policy; a computing resource definition 304 including a name for identifying virtual resource instances launched from the definition 304, a resource type (e.g., virtual machine, data store, message queue, etc.), one or more access control lists or other security sub-policies identifying one or more users and the access permissions they are granted, and one or more properties of the corresponding virtual resource instance; and, a security policy definition 306 including a policy name, policy type, the name of the computing resource the security policy attaches to, and the security policy itself or a reference (e.g., file name) thereto.

A resource allocation system as described above may be configured to create and configure virtual resource instances from the definitions in the template 300. In one example, the resource allocation system may read a computing resource definition 304 for a virtual machine to determine the type and amount of physical and/or virtual resources to allocate for an instance of the virtual machine. This information may be determined from the properties of the definition 304, such as a virtual machine image file or a plurality of parameters identifying the file system, operating system, runtime environment, number and composition of containers, software program(s) to execute, and the like. The properties may also identify how an associated instance should be connected to the virtual network and/or configured as an endpoint connected to an external communication network. In another example, the resource allocation system may read a security policy definition 306 to create a security policy and attach the security policy to the example virtual machine instance.

A second template 350 may comprise the first template 300 augmented with the information needed to perform a resource adoption. In some embodiments, the second template 350 may instantiate all of the resources that the first template 300 instantiates, and in the same manner. Thus, as illustrated, the second template 350 includes the operational resource definitions 302, the computing resource definitions 304, and the security policy definitions 306, as well as parameters such as the template and/or stack ID, of the first template 300. The second template 350 may additionally have adoption data 352 added as one or more parameters. Alternatively, as illustrated, the adoption data 352 may not be fixed within the template, but may instead be template metadata used to perform the adoption; the adoption data 352 may be deleted or discarded when the adoption is complete. The adoption data 352 may include information enabling a system to use the second template 350 to associate the adopted resource with the stack, such as a record associating a name or another logical identifier used to refer to the adopted resource in the template 350 (e.g., identified in a virtual resource definition 354) with a physical identifier (i.e., from the VCE) of the adopted resource. The second template 350 may include a virtual resource definition 354 of the adopted resource. The virtual resource definition 354 may include the relevant parameters needed to encode the configuration of the adopted resource into the template language of the server. An accurate virtual resource definition 354 of the adopted resource enables one or more servers, configured to execute program code in the template language, to associate the adopted resource with the corresponding stack, perform management operations on the adopted resource together with the other stack members as a unit, and perform configuration checks by executing the virtual resource definition 354 to determine whether any—and which—parameters of the adopted resource have changed. The virtual resource definition 354 may be a manually-created definition and/or obtained from the metadata of the associated adopted resource, as described further below.

Figure 4A:
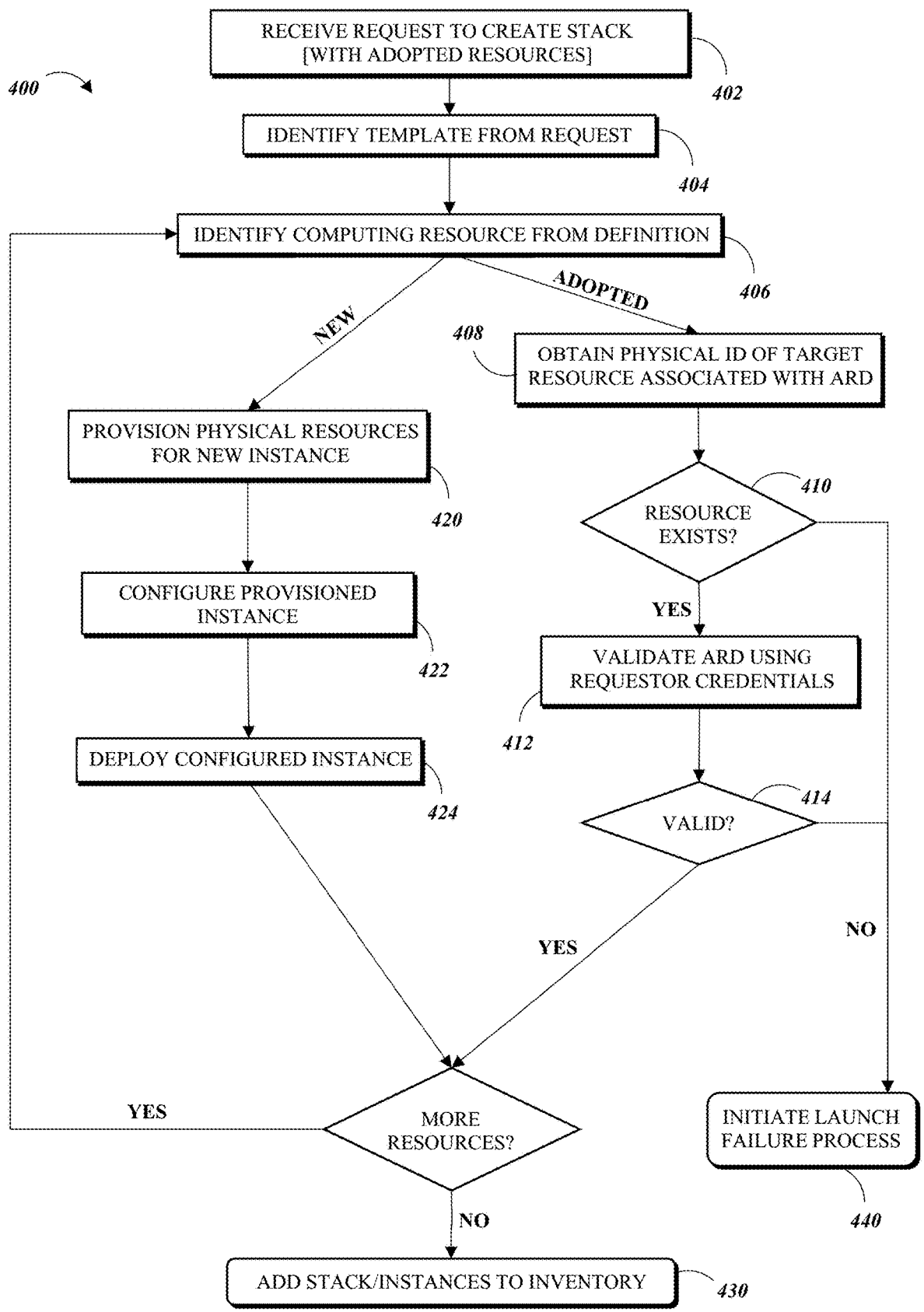
FIG. 4A is a flowchart of an example method of adopting existing virtual computing resources into a new logical container, in accordance with the present disclosure.

FIG. 4A illustrates an example method 400 that the system(s) of FIG. 1, for example, may perform to adopt virtual resources into a logical container, such as a stack that can be instantiated in a VCE. At step 402, the system may receive a request to create a new stack. The new stack may include new virtual resources originally defined by, and launched from, computing resource definitions in the stack template; the new stack may additionally or alternatively include existing virtual resources to be adopted into the new stack. For example, the request to create a new stack may include a resource adoption request. The request(s) may come from the user associated with the virtual resources, such as via an administrator API, or the system may receive a request from an end user connected to the system via an end user API, or another event occurring in the system may trigger the request. The request may include information that allows the system to, at step 404, identify a template containing computing resource definitions for the adopted resources and/or the stack resources to be newly launched from the template. For example, the request may include a stack identifier that the system may use to access a template database and obtain the template associated with the stack identifier.

At step 406, the system may identify a first computing resource definition from the template. The computing resource definition may be for a new resource, or may be an adopted resource definition (ARD). For example, the system may compare the template to the immediately previous "master" version of the template, and may determine that a first ARD is new material to the template. If the computing resource definition is an ARD, at step 408 the system may obtain a physical identifier of the target resource associated with the ARD. For example, the ARD may include a configuration of the target resource, which is a virtual resource instance executing in the client's virtual computing environment; the configuration may include an instance identifier that identifies the target resource within the VCE, and the instance identifier may be obtained as the physical identifier. In another example, the system may present a user interface on the client computing device, enabling the client to provide the physical ID as user input.

At step 410, the system may confirm that the target resource identified by the physical identifier exists, i.e., is executing in the client's VCE. If the system cannot verify that the physical identifier is associated with a valid target resource, the system may initiate a process (step 440) of failing to perform the adoption request and/or the management operation associated with the adoption request. If the target resource does exist (e.g., the system sends a test message to the physical identifier and receives a reply), at step 412 the system may validate the ARD. In one embodiment, the ARD may comprise information describing a configuration of the target resource; this information, and/or the ARD itself, may be provided to the system by an unreliable source, such as through manual entry of the associated template by the client. Validating the ARD may include obtaining, by the system, the actual configuration of the target resource, from the target resource itself, or from the instance inventory, or from a monitoring service or another data source that is tracking information about the target resource. An example method of validating the ARD in this manner is provided below with respect to FIG. 6A. In some embodiments, the system may require permissions to obtain the configuration information, and may for example use a set of credentials associated with the user account of the client, or may use credentials associated with a security group identified by the client, to attempt to access the information.

At step 414, the system determines whether it could validate the ARD. If the system could not access the necessary information, or the system obtained an actual configuration of the target resource and, by comparison, determined that the ARD of the template contains errors, the system may initiate a process (step 440) of failing to perform the adoption request and/or the management operation associated with the adoption request. If the ARD is valid, and there are more computing resource definitions to check, the system may return to step 406 to process the next computing resource definition. If there are no more definitions to process, all of the ARDs are valid, and all of the new stack resources have been deployed, and at step 430 the system may add or update records for each of the virtual resource instances to indicate they are members of the stack, such as by updating an instance inventory maintained by the system as described further below.

Any of the steps 420-430 of processing the stack resource definitions may fail to complete for any of the stack resource definitions, in which case the failure process 440 is initiated to roll back any changes made during execution of the method 400. If the computing resource definition identified at step 406 is for a new stack resource, at step 420 the system may provision virtual computing resources in the VCE for launching a new virtual resource instance from the stack resource definition. At step 422, the system may configure the new virtual resource instance using the configuration identified in the stack resource definition of the template. At step 424, the system may deploy the new virtual resource instance into the VCE. In one embodiment, all of the stack resource definitions may be executed to create associated new instances. At step 430, the system may add or modify records in the instance inventory to include the new instances and/or reflect the adoption of the target resource(s). For example, the system may add the stack identifier to a metadata record for the target resource, and/or may add the logical and/or physical identifier(s) of the target resource to a metadata record for the stack.

Figure 4B:
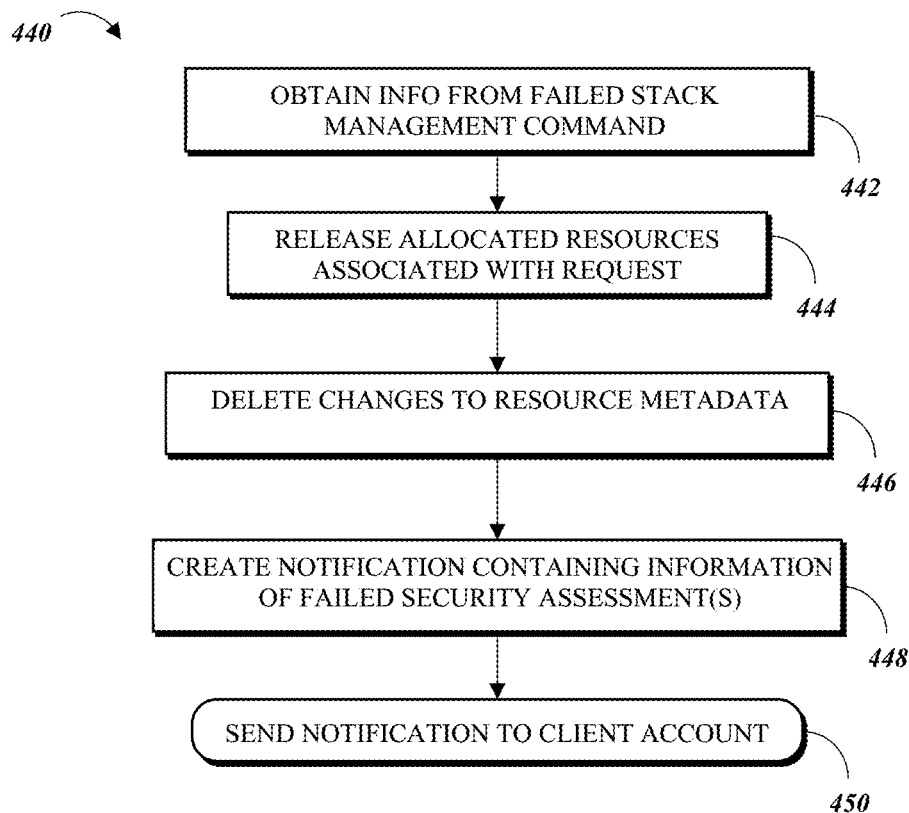
FIG. 4B is a flowchart of an example method of processing a stack deployment failure in connection with the methods of FIGS. 4A and 4C.

FIG. 4B illustrates an example method 440 of processing a failure to execute a step during a management operation including a resource adoption in the presently described systems. At step 442, the system may obtain information describing the failed management operation. At step 444, the system may release any physical and/or virtual computing resources that have been allocated and are associated with the request. For example, where there are multiple virtual resource instances associated with the stack, and one or more of the virtual resource instances has already been provisioned and/or deployed, the system may identify any provisioned and/or deployed instances associated with the request, terminate such instances, and remove or destroy any data links to the request, such that the resources are returned to an available resource pool. At step 446, the system may delete or otherwise roll back any changes to metadata of a resource that were already performed in response to the request. For example, the system may have stored the stack identifier in the instance inventory record for a target resource, or may have stored the instance identifier of the target resource in a record of the stack; these additions may be deleted. At step 448, the system may create a notification containing any of the information obtained regarding the failure to execute the request, and at step 450 the system may deliver the notification to the client user, such as by storing the notification in a usage log or sending an email, push notification, or other alert containing the notification to a client user device. Subsequently, the client user may access the system (e.g., via the administrator user interface) and correct the errors reported in the notification.

Figure 4C:
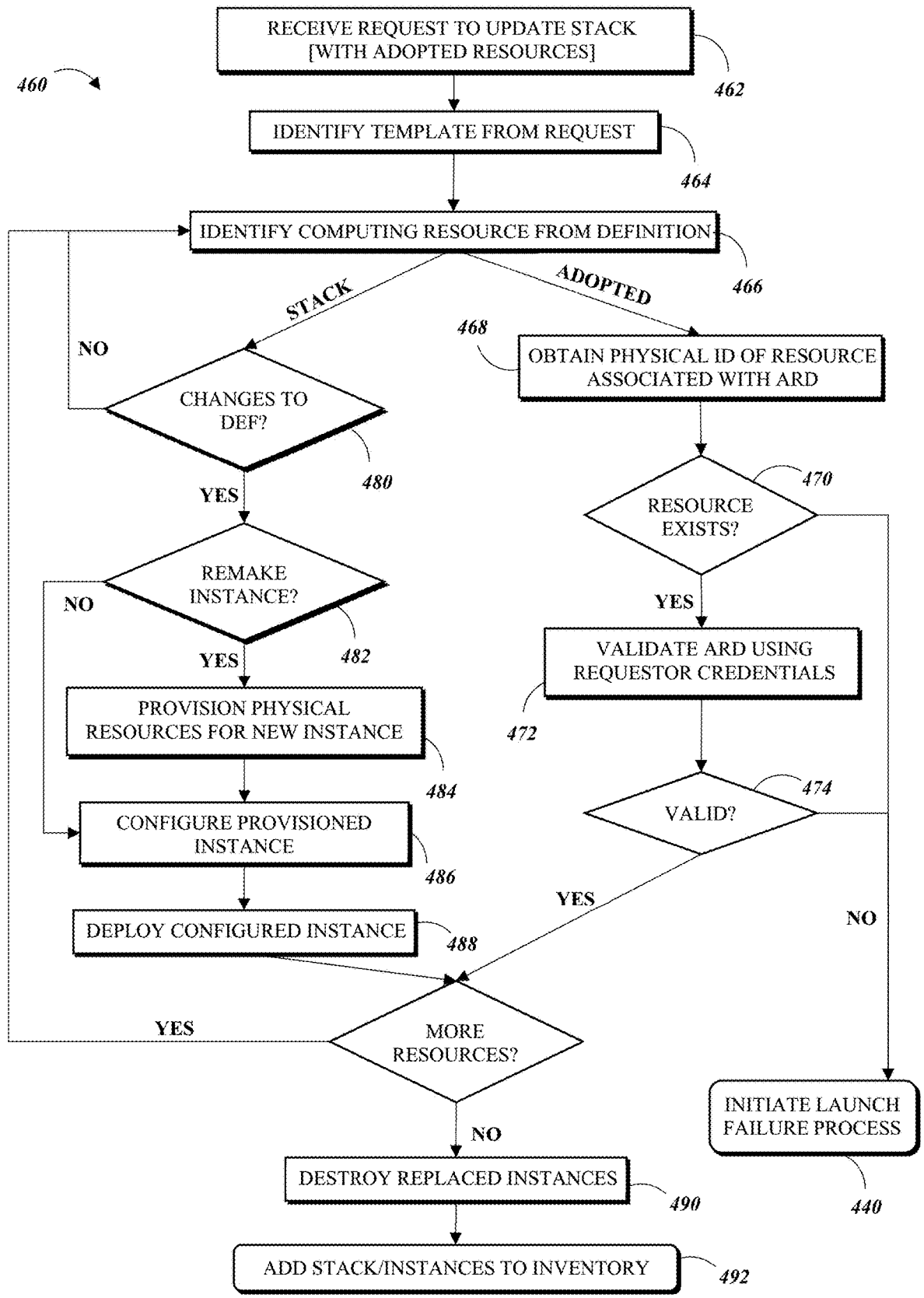
FIG. 4C is a flowchart of an example method of adopting existing virtual computing resources into an existing logical container, in accordance with the present disclosure.

FIG. 4C illustrates an example method 460 that the system(s) of FIG. 1, for example, may perform to add adopted virtual resources as members of an existing logical container, such as a stack that can be instantiated in a VCE. At step 462, the system may receive a request to update an existing stack. The stack may include virtual resources originally defined by, and launched from, computing resource definitions in the stack template; these virtual resource instances may be executing (as members of the stack) in the VCE. The stack may be updated to change, delete, or add stack resources, and/or to include existing virtual resources to be adopted into the stack. For example, the request to update the stack may include a resource adoption request. The request(s) may come from the user associated with the virtual resources, such as via an administrator API, or the system may receive a request from an end user connected to the system via an end user API, or another event occurring in the system may trigger the request. The request may include information that allows the system to, at step 464, identify a template containing computing resource definitions for the adopted resources and the stack resources. For example, the request may include a stack identifier that the system may use to access a template database and obtain the template associated with the stack identifier.

At step 466, the system may identify a first computing resource definition from the template. The computing resource definition may be for a stack resource, or may be an ARD. For example, the system may compare the template to the immediately previous "master" version of the template, and may determine that a first ARD is new material to the template. If the computing resource definition is an ARD, at step 468 the system may obtain a physical identifier of the target resource associated with the ARD. For example, the ARD may include a configuration of the target resource, which is a virtual resource instance executing in the client's virtual computing environment; the configuration may include an instance identifier that identifies the target resource within the VCE, and the instance identifier may be obtained as the physical identifier. In another example, the system may present a user interface on the client computing device, enabling the client to provide the physical ID as user input.

At step 470, the system may confirm that the target resource identified by the physical identifier exists, i.e., is executing in the client's VCE. If the system cannot verify that the physical identifier is associated with a valid target resource, the system may initiate a process (step 440) of failing to perform the adoption request and/or the management operation associated with the adoption request. If the target resource does exist (e.g., the system sends a test message to the physical identifier and receives a reply), at step 472 the system may validate the ARD as described herein. At step 474, the system determines whether it could validate the ARD. If the system could not access the necessary information, or the system obtained an actual configuration of the target resource and, by comparison, determined that the ARD of the template contains errors, the system may initiate a process (step 440) of failing to perform the adoption request and/or the management operation associated with the adoption request. If the ARD is valid, and there are more computing resource definitions to check, the system may return to step 466 to process the next computing resource definition. If there are no more definitions to process, all of the ARDs are valid, and all of the affected stack resources have been updated.

Any of the steps 480-492 of processing the stack resource definitions may fail to complete for any of the stack resource definitions, in which case the failure process 440 is initiated to roll back any changes made during execution of the method 460. If the computing resource definition identified at step 406 is for a stack resource, at step 480 the system may determine whether the stack update operation includes any changes to the identified resource definition. For example, the system may compare the updated stack template to the previous stack template used to launch or update the virtual resource instance associated with the identified resource definition. If there are no changes, the system may identify the next computing resource definition (step 466). If there are changes, at step 482 the system may determine whether the changes to the resource definition require the launch of a new virtual resource instance, either from a new computing resource definition or from an updated definition that requires the associated instance to be restarted and/or remade. For example, an update to an existing virtual machine definition may include a new version of the operating system, requiring the system to de-provision the executing instance and launch a new one with the new configuration.

If a new instance is needed, at step 484 the system may provision virtual computing resources in the VCE for launching a new virtual resource instance from the updated stack resource definition. If a new instance is not needed, or after the new instance has been provisioned, at step 486 the system may configure the virtual resource instance using the configuration identified in the updated stack resource definition of the template. At step 488, the system may deploy the new and/or reconfigured virtual resource instance into the VCE. At step 490 the system may perform cleanup operations such as destroying virtual resource instances that were replaced, and otherwise releasing allocations of resources that are no longer needed. At step 492, the system add or update records for each of the virtual resource instances to indicate they are members of the stack, such as by updating an instance inventory maintained by the system as described further below.

Figure 5A:
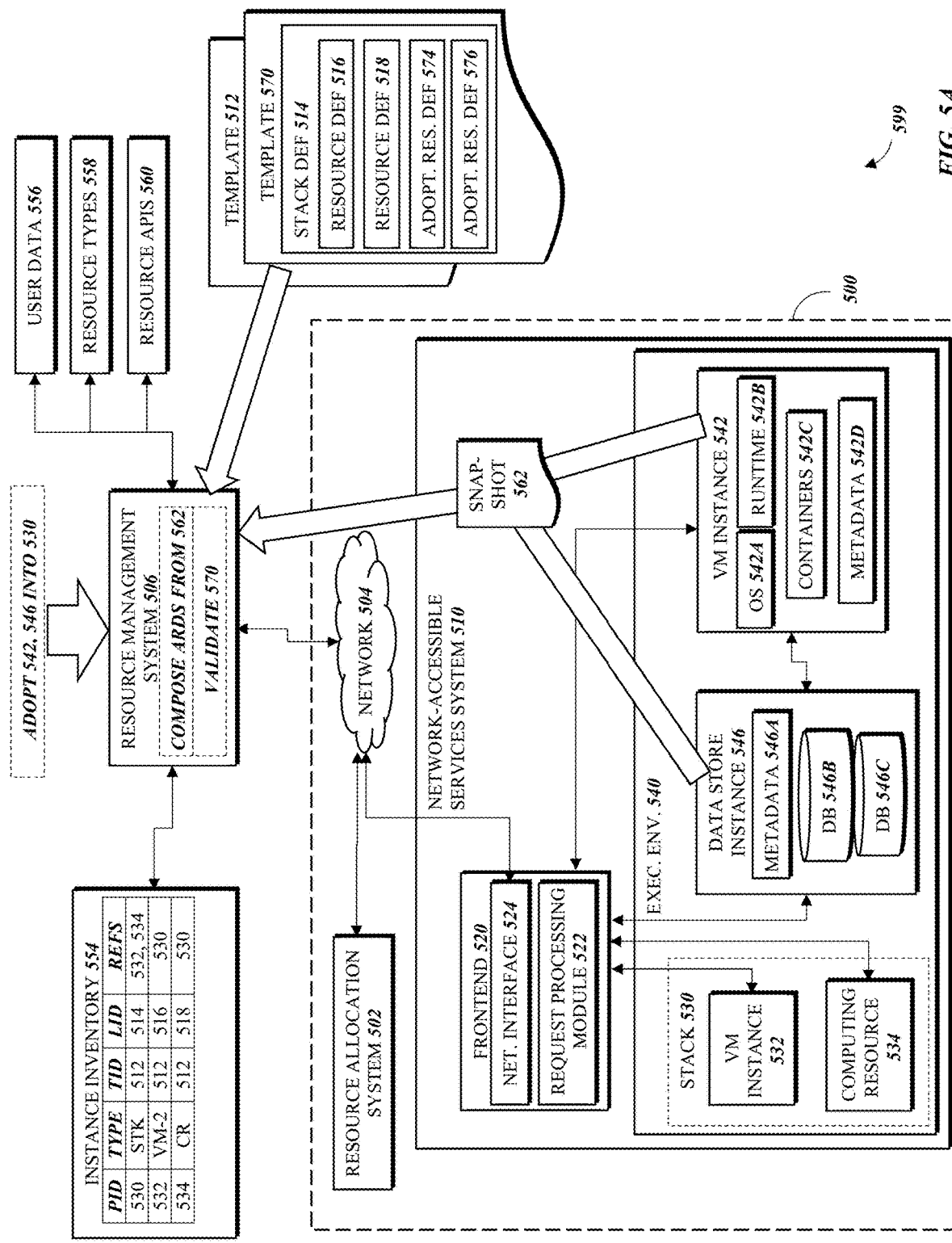
FIGS. 5A-C are diagrams of another example computing environment implementing a progression of example methods of validating a resource adoption template, adopting resources into an existing logical container, and detaching previously adopted resources from a logical container, in accordance with the present disclosure.
Figure 5B:
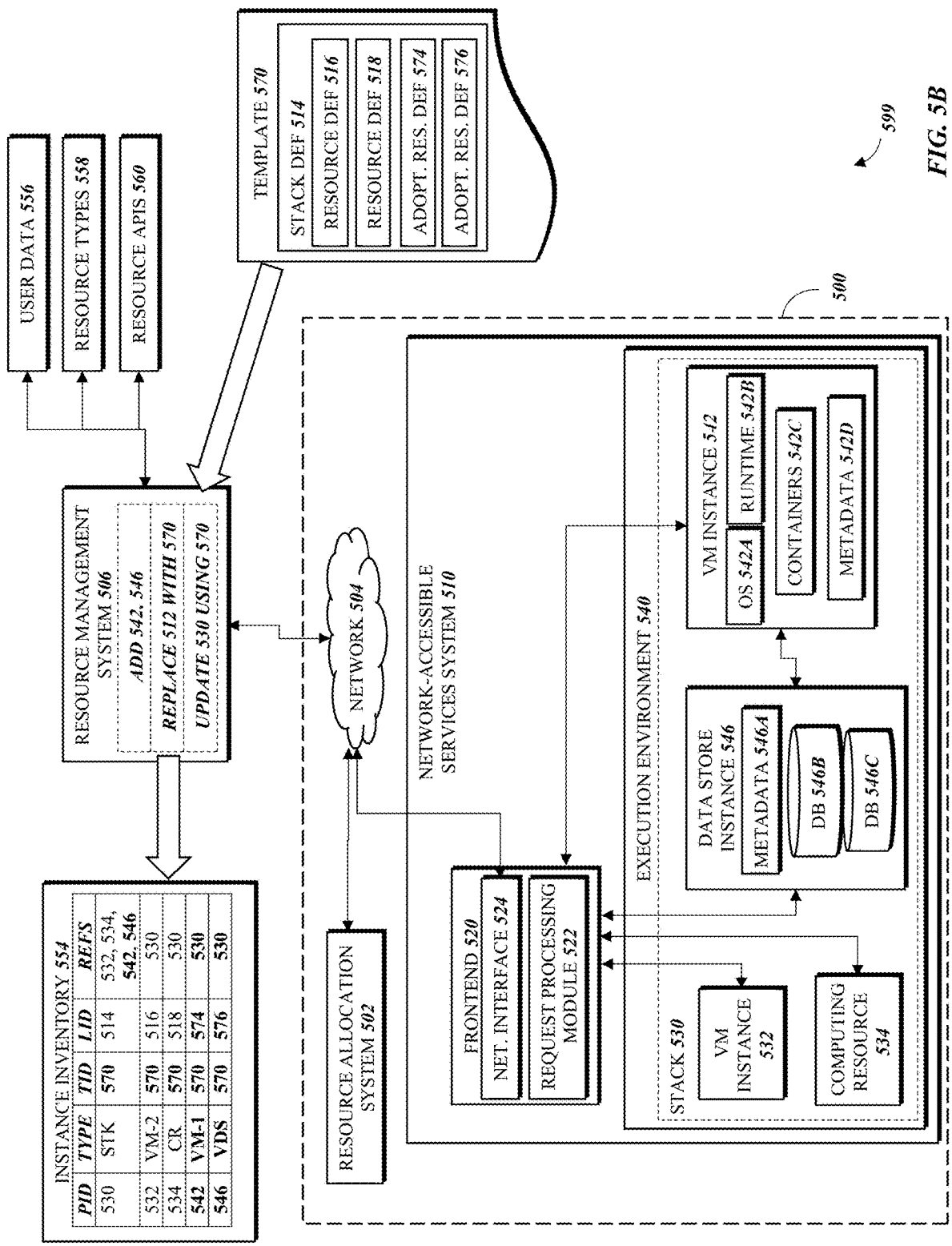
Figure 5C:
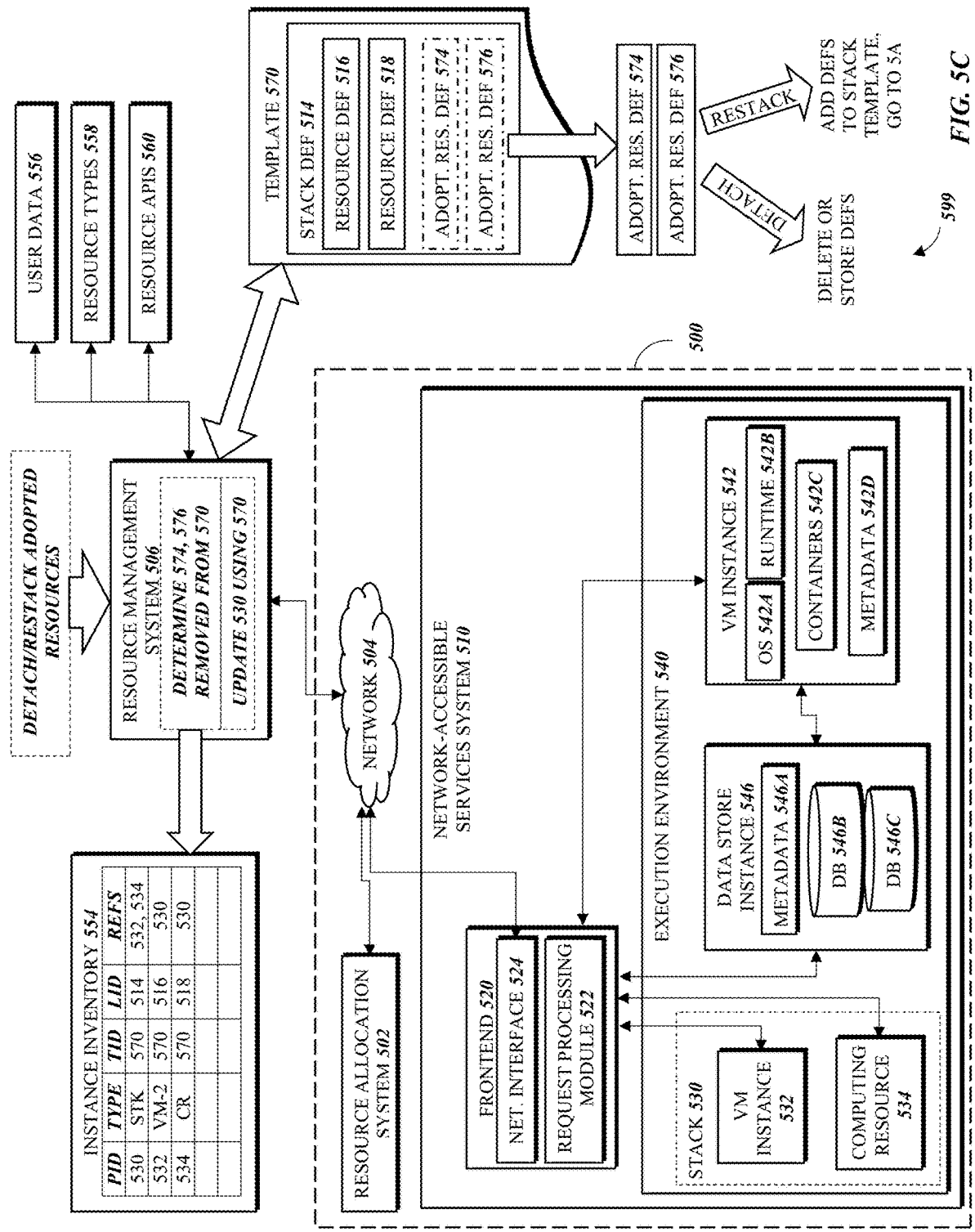

FIGS. 5A-C present example operations, within a computing resource service provider 599 (which may be identical or similar to the computing resource service provider 199 of FIG. 1, or may be an entirely different type of system), by which a resource management system 506 (as described above with respect to the resource management system 106 of FIG. 1) performs resource adoption actions on virtual computing resources executing in a VCE 500 or similar computing environment. The example of FIGS. 5A-C is directed to adopting and detaching virtual resource instances launching and executing within a particular network-accessible services system 510 that executes within a virtual computing environment 500 and is associated with a particular user of the computing resource service provider 599. A virtual machine instance 544 and a data store instance 546 are illustrated as examples; it is contemplated that the described operations can be adapted, without undue experimentation, for use on any type of virtual resource instances, including without limitation a message queueing service, a notification service, an end-user virtual computing environment, a load balancer, a serverless execution environment and/or virtual machine instances and container instances thereof, a machine learning service, a search engine, an analytics engine, a data encryption management service, and the like.

A resource allocation system 502 of the virtual computing environment 500 may perform any of the operations described above with respect to the resource allocation system 120 of FIG. 1. In particular, the resource allocation system 502 may receive requests to launch virtual machine instances within the virtual computing environment 500. In addition to sending the request, or parsing the request into parameters and sending some or all of the parameters, to the resource management system 506, the resource allocation system 502 sends the request to a frontend 520 of a network-accessible services system 510 corresponding to the user associated with the request. The resource allocation system 502 may also receive messages from the resource management system 506 that contain outcomes of requested and/or automated resource adoption and/or template transformation actions.

A network-accessible services system 510, or various constituents thereof, could implement various Web services components, hosted or "cloud" computing environments, and/or peer-to-peer network configurations to implement at least a portion of the processes described herein. The network-accessible services system 510 may operate in a distributed computing environment including several computer systems (e.g., servers 150 of FIG. 1) that are interconnected using one or more computer networks. The network-accessible services system 510 could also operate within a computing environment having a lesser or greater number of devices than are illustrated in FIG. 1. Additionally, there may be multiple network-accessible services systems associated with the user, which may all have the same configuration, or all different configurations, or a combination thereof. Thus, the depictions of the network-accessible services system 510 should be taken as illustrative and not limiting to the present disclosure.

Further, a network-accessible services system 510 may be implemented in hardware and/or software and may, for instance, include one or more physical or virtual servers implemented on physical computer hardware configured to execute computer executable instructions for performing various features that will be described herein. The one or more servers 502 may be geographically dispersed or geographically co-located, for instance, in one or more data centers. In some embodiments, the network-accessible services system 510 may be disposed in a computing environment 500 that is communicatively isolated from other computing environments (not shown) of the computing resource service provider 599. For example, the isolated computing environments (including virtual computing environment 500) may, in some embodiments, be "regions" of an overarching compute resource network implemented by the computing resource service provider 599; these regions may be independent of each other, and may represent a geographic area (e.g., Eastern United States, Western United States, and Europe may all be regions) of the overarching compute resource network. Such independence may mean that the compute resources made available in a particular region are dedicated to that region and are controlled by a regional instance of the network accessible services system, so as to isolate the region from other regions. One effect may be that adoptions of virtual resource instances in the network-accessible services system 510 of one region may not necessarily take place in other regions.

The network-accessible services system 510 may be connected to a communication network 504 that is implemented by or within the computing environment 500. The network 504 may, for example, be a virtual private network or another virtual network, or may include both physical and virtual components. In some embodiments, any of the components within the network-accessible services system 510 can communicate with other components of the computing environment 500 via the network 504. In other embodiments, not all components of the network-accessible services system 510 are capable of communicating with other components of the computing environment 500. In one example, only a frontend 520 may be connected to the network 504, and other components of the network-accessible services system 510 may communicate with other components of the computing environment 500 via the frontend 520. Additionally, the network 504 may be used to communicate with systems and resources inside the computing environment 500, such as the resource allocation system 502 and any local (i.e., instantiated within the virtual computing environment 500) data stores, and/or outside of the computing environment 500, such as the resource management system 506 and other systems and resources in the data processing architecture of the computing resource service provider 599.

The frontend 520 may provide interfaces for exchanging data with external resources and devices, including a network interface 524 for sending and receiving data over communication networks, for example to communicate with the resource management system 506. In one embodiment, the frontend 520 serves as a front door to all the other services provided by the network-accessible services system 510. The frontend 520 may receive and process (e.g., using a request processing module 522) all of the requests to launch virtual machine instances within the network-accessible services system 510. The frontend 520 may receive such requests using any suitable protocols, including, for example, HTTP, MQTT, and CoAP, as discussed above. Any metadata or other information (e.g., headers and parameters) included in the request may also be used to process the request.

Additionally, the frontend 520 may process messages from the resource management system 506 and/or the resource allocation system 502. Alternatively, the frontend 520 may process and respond to messages from the resource allocation system 502 and/or the resource management system 506 requesting information, such as the number of virtual machine instances associated with the user and concurrently executing on the network-accessible services system 510. The frontend 520 may also process and respond to messages from the resource allocation system 502 and/or the resource management system 506 requesting other information, such as usage data describing the execution of a particular virtual machine instance; or, the frontend 520 may be configured to automatically, such as at a particular time or in response to an event, send such information to the resource allocation system 502, to the resource management system 506 (e.g., to maintain an instance inventory 554), or to a data storage service.

The frontend 520 may communicate with other components of the network-accessible services system 510 in order to launch and manage instances that are associated with a user/user account and that have been launched and are concurrently executing within an execution environment 540 of the network-accessible services system 510. The execution environment 540 may be associated with various configuration parameters for controlling execution of the virtual resource instances, such as limits on the number of virtual resource instances of or certain types of resources concurrently executing, usage of underlying compute resources, etc. In some embodiments, the frontend 520 and/or the resource management system 506 may maintain a list of instances in the execution environment 540. The list of instances may include a record comprising metadata of each instance. In one embodiment, the list of instance may be or include an instance inventory 554 that maintains records, such as metadata records or database records, describing the virtual resource instances associated with a stack 530 instantiated in the execution environment 540. The instance inventory 554 may include, for each instance associated with a stack, the physical identifier (which may be the instance identifier for some resource types), the resource type, the template identifier of the template used to launch the instance, the logical identifier used to identify the instance's associated resource definition in the template, and an array of references to other virtual resource instances that the instance communicates or is otherwise associated with. Other elements of a record may further specify the configuration (e.g., type, OS, etc.) of the instances. Some records may not have all of the elements, or may lack a value for certain elements if the value is not applicable or not set. For example, as shown in FIG. 5A, a virtual machine instance 542 and a data store instance 546 that are not launched from a template and do not belong to a stack may not appear in the instance inventory 554.

The frontend 520 and/or the resource allocation system 502 and/or the resource management system 506 may have access to this list and may use it to manage the executing instances. For example, the list may be used to identify members of the stack 530 (i.e., a virtual machine instance 532 and a computing resource instance 534) to which a management operation on the stack 530 should be applied. In another example, the list may be used to associate an instance identifier of an adopted resource with the stack that is adopting the resource, so that the adopted resource becomes a member of the stack without deleting, changing, or interfering with the adopted resource. The frontend 520 may track stacks 530 and/or other logical containers deployed in the VCE 500 as if the stacks 530 themselves are resources executing in the executing environment 540; alternatively, the frontend 520 may simply keep a record of the stack's 530 creation and a list of the virtual resource instances contained as members of the stack 530 (e.g., an instance inventory 554 as illustrated).

In the depicted example, a first system state represented in FIG. 5A includes, for illustrative purposes, a virtual machine instance 542 and a data store instance 546 already executing in the execution environment 540. Virtual machine instances may have operating systems (OS) and/or language runtimes loaded thereon. For example, the instance 542 has an OS 542A, a runtime 542B, and containers 542C. Containers are logical units created within a virtual machine instance using the resources available on that instance. In one embodiment, such containers are implemented as Linux containers. The virtual machine instances may have one or more containers created thereon and have one or more program codes associated with the user loaded thereon (e.g., either in one of the containers or in a local cache of the instance). In some embodiments, containers may be tracked with other virtual resource instances (e.g., in the instance inventory 554); a container may be adopted into a stack on its own, or the containers of a virtual machine instance may be adopted into a stack together with the VM instance. Each container may have credential information made available therein, so that user codes executing on the container have access to whatever the corresponding credential information allows them to access.

Similarly, a data store instance 546 may have credential and other access information made available therein, in addition to default data store parameters such as one or more storage volumes storing databases 546B, C, a file system, and the like. The VM instance 542 and data store instance 546, and any virtual resource instance, may have metadata 542D, 546A associated therewith. The metadata may include key/value pairs associated with parameters of the instance configuration, execution details such as launch time and monitoring data, status information, and the like. Thus, metadata may depend on the resource type of the instance, as well as the execution history of the instance. Example metadata 542D of a VM instance 542 may include, without limitation, the operating system 542A, runtime environment 542B, identifiers and other metadata for containers 542C (which may additionally or alternatively have their own metadata), resource type (e.g., virtual machine) and subtype (e.g., networking-optimized VM), type of virtualization, type of computing architecture, connections to virtual network interfaces and other virtual resources, security groups, image identifier for a machine image used to launch the VM instance 542, IP address, logical device and/or block device mappings, and the like. Example metadata 546A of a data store instance 546 may include, without limitation, identifiers and metadata for connected databases 546B, C, security group, region of instantiation, connections to notification streams and/or other virtual computing resources, and the like.

The illustration of the various components within the network-accessible services system 510 is logical in nature and one or more of the components can be implemented by a single computing device or multiple computing devices. In some embodiments, the network-accessible services system 510 may comprise multiple frontends, multiple active pools, and other execution spaces for various types of virtual resources. The embodiments described herein are not limited by the illustrated amount of deployed and requested resources, and one skilled in the art will appreciate that the network-accessible services system 510 may comprise any number of virtual resource instances implemented using any number of physical computing devices 502.

In accordance with the example system depicted in FIG. 1, FIGS. 5A-C illustrate several types of system data that can be received by or made available to the resource management system 506 in order to perform resource adoption tasks. An instance inventory 554 may include the records for the virtual resource instances executing in the VCE 500 and associated with a particular stack of one or more stacks, as described above. User data 556 may include user account data, user profile information, user-submitted and/or derived user preferences, user-submitted configuration settings, credentials and other security settings, and the like. The resource type definitions 558 may include all of the information needed by the resource management system 506 to identify resource types of the virtual resource instances and interpret metadata of the instances. Resource APIs 560 may include all of the information needed to enable the resource management system 506 to communicate with (e.g., send commands understood by, and understand responses received from) instances of any resource type.

In some embodiments, the resource management system 506 may receive templates 512, 570 comprising program code for virtual resource definitions and other data elements associated with a stack. The templates 512, 570 may be received from a data storage service, or directly from user input. In some embodiments, the resource management system 506 may create or modify the templates 512, 570. For example, the resource management system 506 may receive an original or master template 512 used to launch the stack 530 and its associated resources 532, 534, and may compose ARDs from a snapshot 562 of the target resources 542, 546 for adoption to produce an adoptive template 570 that includes the previous stack definition 514 and resource definitions 516, 518 for the stack resources 532, 534 as well as ARDs 574, 576 for the VM instance 542 and the data store instance 546.

In the context of the above system, FIGS. 5A-C illustrate an example data processing flow whereby virtual resource instances that are not instantiated from a template 512, 570 can be added to and removed from logical containers without deleting, modifying, or interfering with the virtual resource instances. Referring to FIG. 5A, a request to adopt "candidate" resources, which do not belong to a logical container, is received by the system. The request may originate in user input from an end user, or from a command issued by the client, or from another triggering event, and may be received by the resource management system 506. The request may be for adoption of a single virtual resource instance, a plurality of instances of a virtual resource type, a plurality of instances of multiple resource types, or all candidate resource instances in the VCE 500, where the instances may or may not be interconnected in some fashion. For example, and as illustrated, the request may be to update a stack 530 of multiple resources—specifically, a virtual machine instance 532 and another computing resource 534—to include the VM instance 542 and the data store instance 546 as members. In some embodiments the request may identify a template 512 presently serving as the "source of truth" (i.e., accurately identifying all of the resources that are members) of the stack 530. In the illustrated example, the template 512 was previously used to launch the stack 530 and the stack resources 532, 534 into the VCE 500, as shown in the associated records of the instance inventory 554. In other embodiments, the identified template may be the adoptive template 570, which may have the same identifier as the master template 512 or a different identifier.

In the state of FIG. 5A, the adoptive template 570 was previously created, and the resource management system 506 validates the adoptive template 570 before adopting it as the source of truth (i.e., replacing the master template 512). Validating may include collecting one or more snapshots 562 of the target resources 542, 546 and using a snapshot 562 to compose an actual resource definition for each of the target resources 542, 546. The resource management system 506 may then compare the definitions it generated to the ARDs 574, 576 of the adoptive template 570 to confirm that the ARDs 574, 576 accurately describe the corresponding target resources 542, 546. In another embodiment, the resource management system 506 may directly obtain the metadata 542D, 546A of the target resources 542, 546, extract the key/value pairs associated with configuration parameters, and compare the key/value pairs to the ARDs 574, 576 to determine the accuracy of the latter.

Referring to FIG. 5B, assuming the adoptive template 570 passes the validation, the adoptive template 570 can replace the master template 512. In some embodiments, the resource management system 506 may update the records in the instance inventory 554 that referenced the master template 512 to instead reference the adoptive template 570. To adopt the instances 542, 546 into the stack 530, the resource management system 506 may add records for the instances 542, 546 to the instance inventory 554; the records for the newly adopted resources may reference the stack identifier of the stack 530, and/or the template identifier of the adoptive template 570, and/or the logical identifier of the ARD 574, 576 used to define the instance 542, 546 in the adoptive template 570. Additionally or alternatively, the resource management system 506 may update the record for the stack 530 to include references to (e.g., instance identifiers of) the instances 542, 546 that are now members of the stack 530. Additionally or alternatively, the resource management system 506 may modify a resource instance of the stack 530 executing in the execution environment 540. For example, a stack instance may include a data structure storing a data object for each of its members; the resource management system 506 may create a data object for each of the instances 542, 546 from their corresponding ADRs 574, 576 and store the data objects in the data structure of the stack instance.

Referring to FIG. 5C, a previously adopted resource may be detached from its adoptive stack 530 and left as a candidate resource or added to another stack. The resource management system 506, may in some embodiments receive a request to detach or restack the adopted resource instances 542, 546 of the stack 530; additionally or alternatively, the resource management system 506 may receive a request to perform a stack management operation on the stack 530, and may determine that the request includes a command or metadata indicating that one or both of the adopted resource instances 542, 546 are to be detached from the stack 530. In some embodiments, such metadata maybe used to differentiate between instructions for deleting an identified resource and instructions for detaching the identified resource. For example, the resource management system 506 may receive (e.g., from the user) a revised stack template that is the adoptive template 570 with the ARDs 574, 576 removed; the resource management system 506 may use the metadata in the request to determine that the corresponding virtual resource instances 542, 546 should be removed from the stack 530 but NOT deleted or destroyed. In other embodiments, the resource management system 506 may receive the adoptive template 570 and remove the ARDs 574, 576 previously stored therein. If the ARDs 574, 576 are not needed to restack the instances 542, 546, the ARDs 574, 576 may be destroyed, or may be stored for later retrieval if either of the instances 542, 546 are again adopted. If the instances 542, 546 are to be immediately restacked, the system may return to the state of FIG. 5A, using the ARDs 574, 576 in the template of the new adoptive stack. The resource management system 506 may then update the records of the instance inventory 554, such as by removing the records of the detached instances 542, 546 and/or removing references to the instances 542, 546 from the record of the stack 530.

Figure 6A:
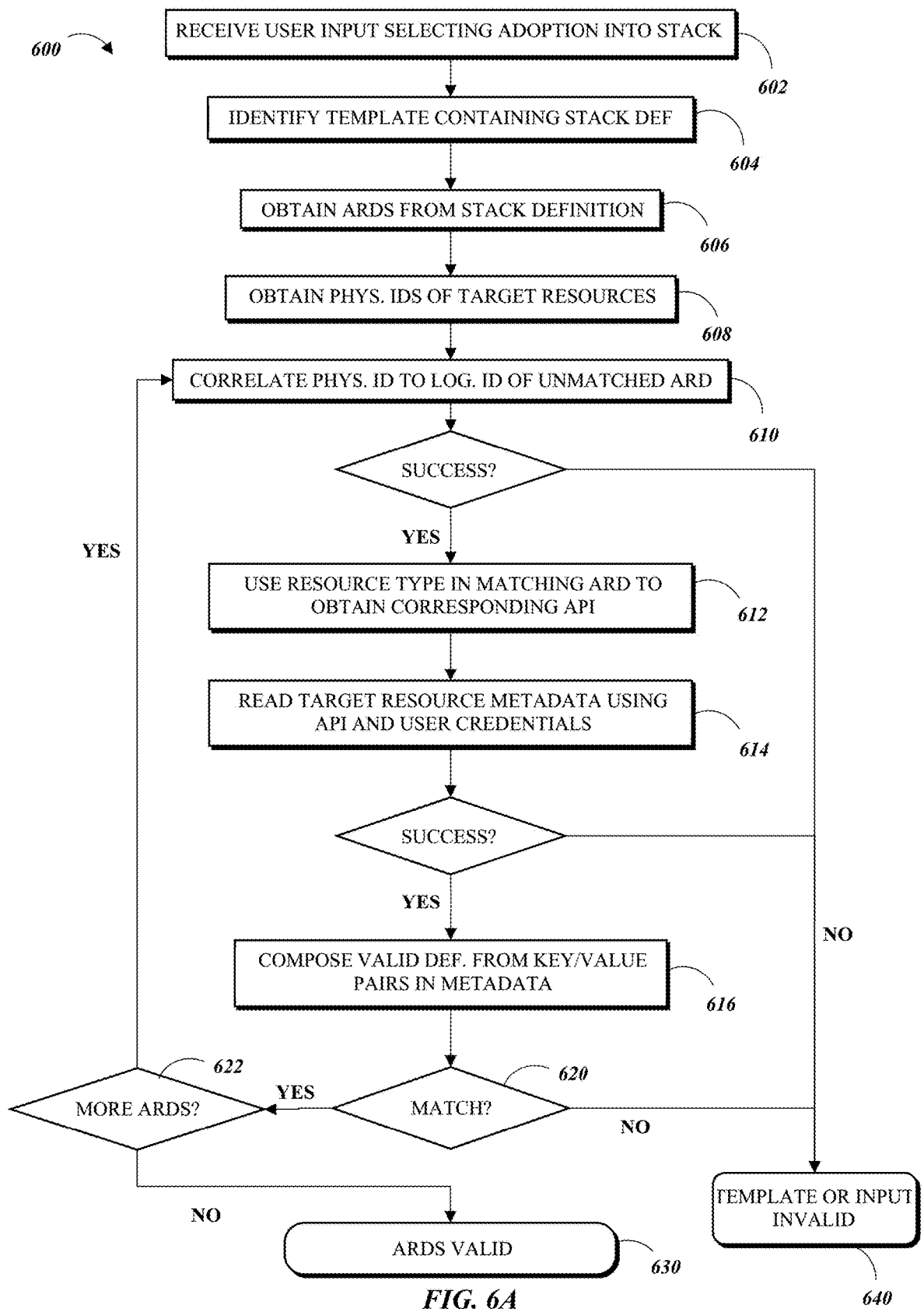
FIG. 6A is a flowchart of an example method of validating adopted resource definitions of a stack template, in accordance with the present disclosure.

Referring to FIG. 6A, an example method 600 may be performed by the system, in the computing environment 500 of FIGS. 5A-C, for example, to validate an ARD provided in a template for launching a stack of virtual resources, as described above. At step 602 the system may receive user input selecting an option to adopt existing virtual resource instances into the stack. For example, the system may cause a user interface to be presented at a computing device of the owner of the stack and resources, and the user interface may enable the owner to select resource adoption and provide a stack template containing user-generated ARDs. At step 604, the system may identify the stack template to be validated. At step 606, the system may obtain the ARD(s) from the stack template. For example, the ARDs may be identified by their logical or physical IDs in the user input.

At step 608, the system may obtain the physical identifiers of the target resources to be adopted via the ARDs. In some embodiments, a user may enter the physical identifiers into a user interface, as described further below with respect to FIG. 6B. In another example, the stack template owner may hard-code the physical identifiers into the stack template, such as by including the physical identifier as a property of the ARD. At step 610, the system may correlate the physical identifier to its logical identifier in the template. In some embodiments, each of the ARDs has a logical identifier, and the physical identifier of one of the target resources is intended to be associated with the logical identifier. A user may provide these associations in some embodiments, such as by entering them in a user interface or directly in the template. However, if the physical identifier cannot be matched to an unmatched logical identifier, a failure process indicating the template or the user input is invalid may be initiated (step 640).

At step 612, the system may determine the resource type of the target resource from the ARD that was matched to the target resource in step 610, and may obtain an API that corresponds to the resource type. For example, the computing resource service provider may be configured to a certain number of defined resource types, each of which may have a set of commands that can be issued, using a resource API, to virtual resource instances of the instance type; the API enables changes to be made and/or information (e.g., configuration parameters) to be obtained from the instance, provided the requestor has the proper permissions. At step 614, the system may use the identified API and the credentials of the stack owner to attempt to read the metadata of the target resource. If the request is rejected or otherwise fails (e.g., the credentials are not authorized), the system may initiate the failure process (step 640). If the system can access the metadata of the target resource, the system may obtain a set of key/value pairs describing the configuration parameters of the target resource. In one example, each parameter referenced in the ARD is obtained, for the purpose of validating the values. In another example, all of the configuration parameters are retrieved.

At step 616, the system may compose the key/value pairs into a data structure that can be compared to the ARD. For example, the system may generate an ARD in the server's template language. In another example, the system may simply store the key/value pairs, such as in an XML file. At step 620, the system may compare the composed definition to the ARD to determine whether the configuration described in the ARD is the accurate configuration of the target resource. For example, the system may parse the ARD into an XML file listing the corresponding key/value pairs, and may compare the XML file to the corresponding XML file composed at step 616. If there is no match, the failure process (step 640) may be initiated to indicate that the template's ARD is invalid. If the composed definition and the ARD do match, the system checks (step 622) whether more ARDs must be validated; if so, the system may return to step 610, and if not, all of the ARDs are determined to be valid (step 630).

Figure 6B:
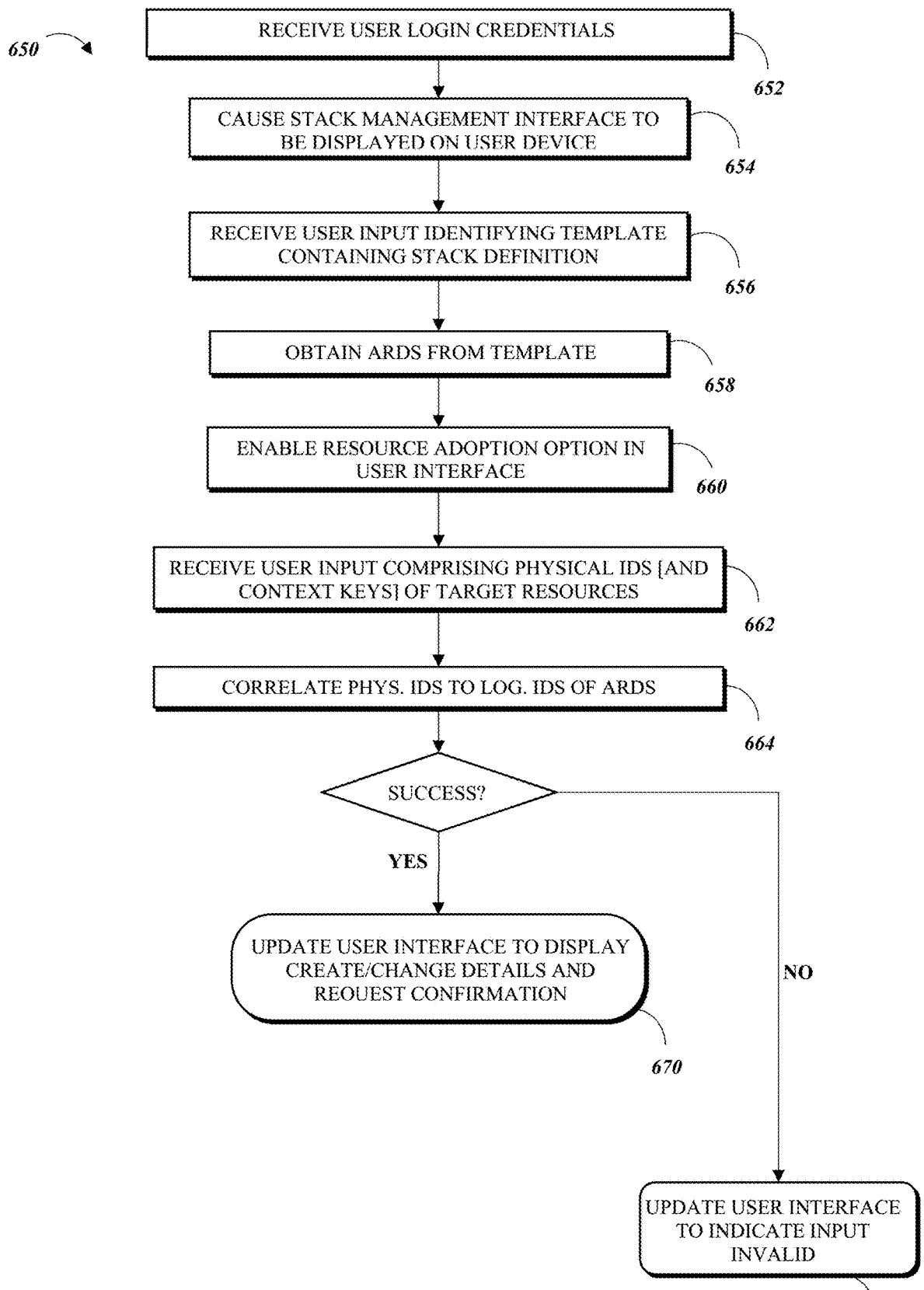
FIG. 6B is a flowchart of an example method of identifying a stack template and target resources for adoption, as in FIG. 6A, via a user interface, in accordance with the present disclosure.

FIG. 6B illustrates an example method 650 for interacting with a user to initiate the resource adoption process as described herein. At step 652, the system may receive user login credentials, such as a username and password associated with the user's user account with the computing resource service provider. With the user logged in, at step 654 the system may cause a stack management interface to be displayed on the user device. The stack management interface may enable the user to view and change stack templates, monitor the status of instantiated stacks, create and update stacks, and perform other stack management operations that can be applied to all of the virtual resources that are members of the stack as a unit. The stack management interface may further enable the user to select an option for adopting candidate resources and to enter necessary information to perform the adoption. It will be understood that the stack management interface may also enable a user to initiate un-adoption, or detachment, of adopted resources as described herein. An example stack management interface is depicted as a web user interface 700 in FIGS. 7A-D, but may additionally or alternatively be presented as a console, a dashboard, a command line, a dedicated software application, and any other suitable user interface.

Figure 7A:
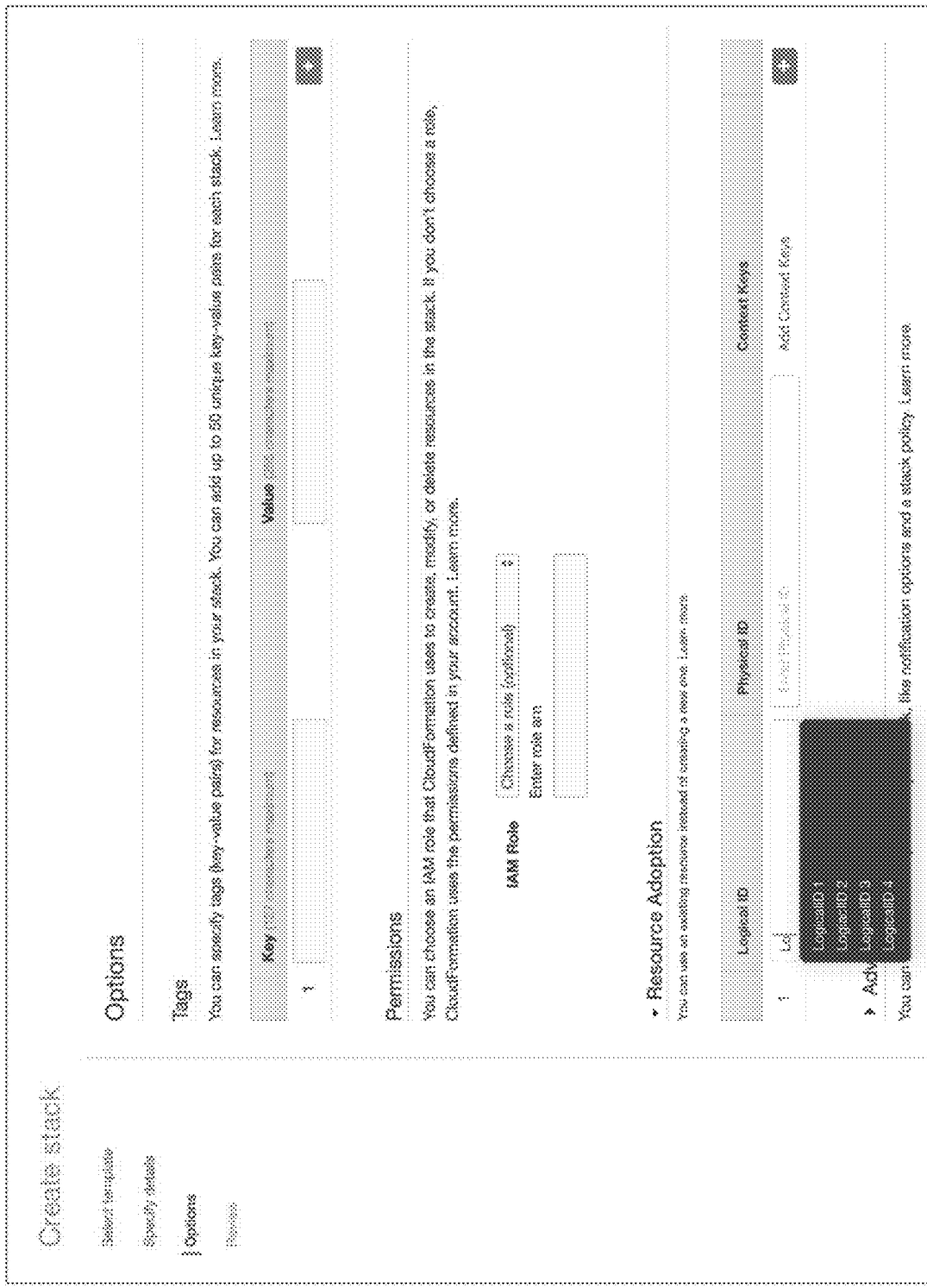
Figure 7B:
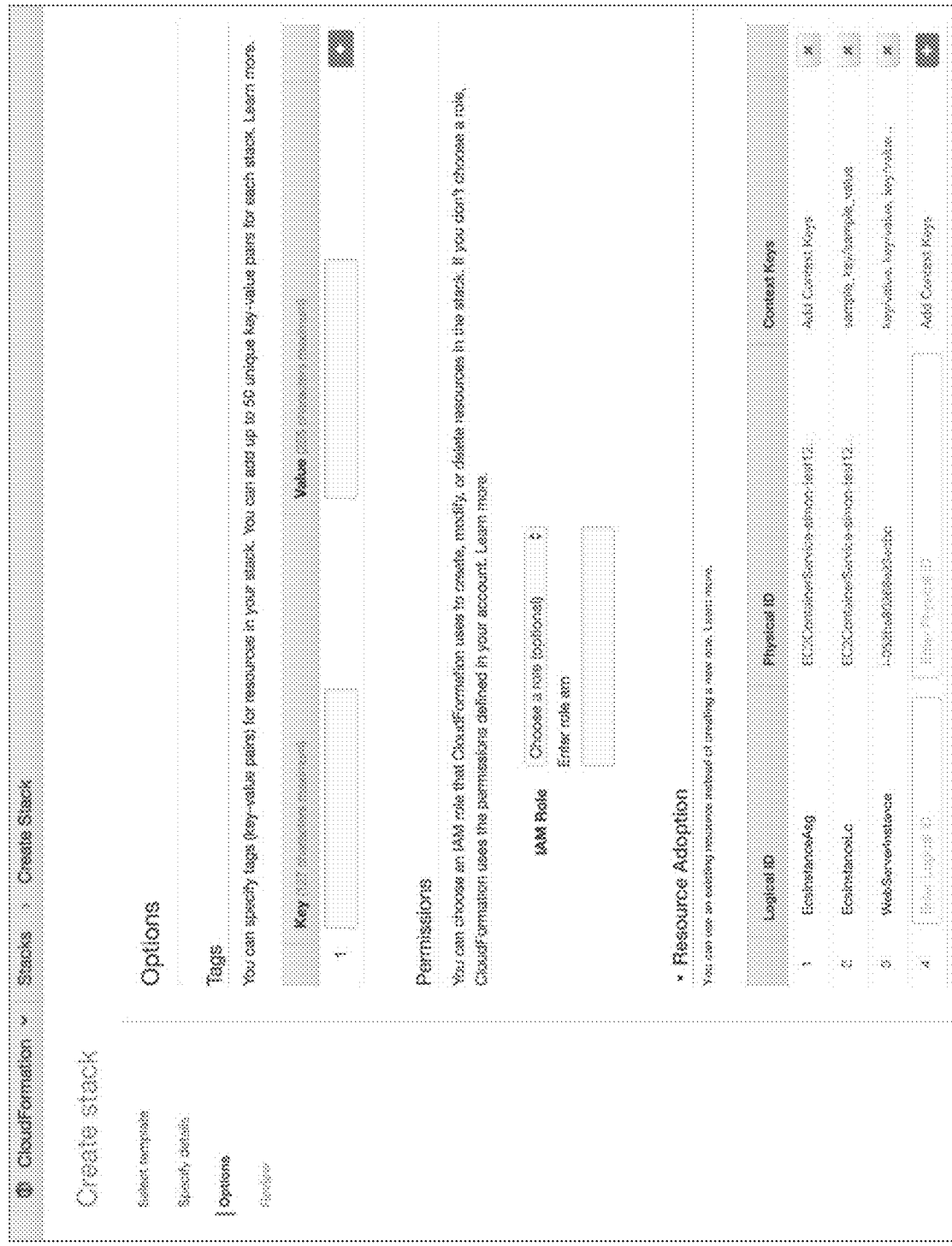
Figure 7C:
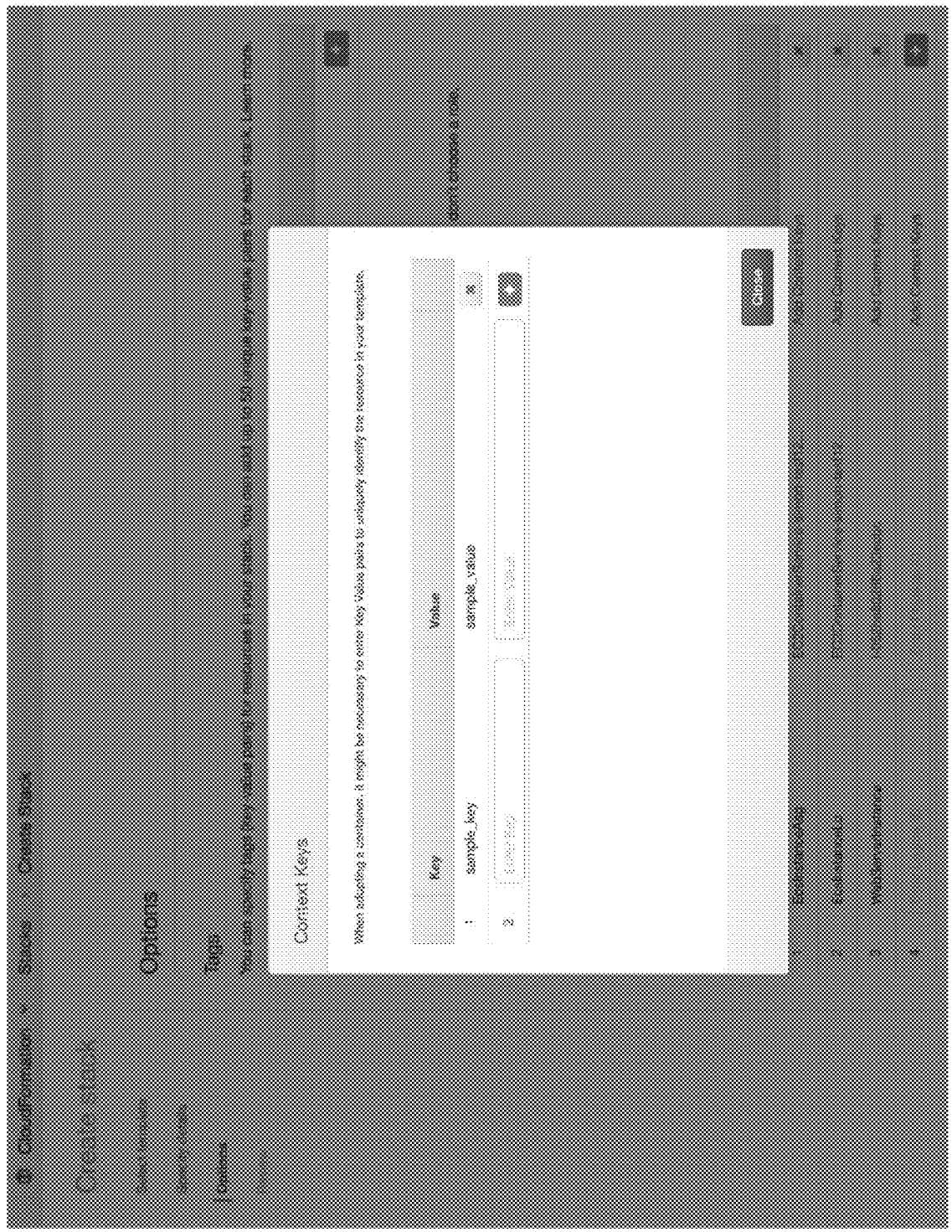
Figure 7D:
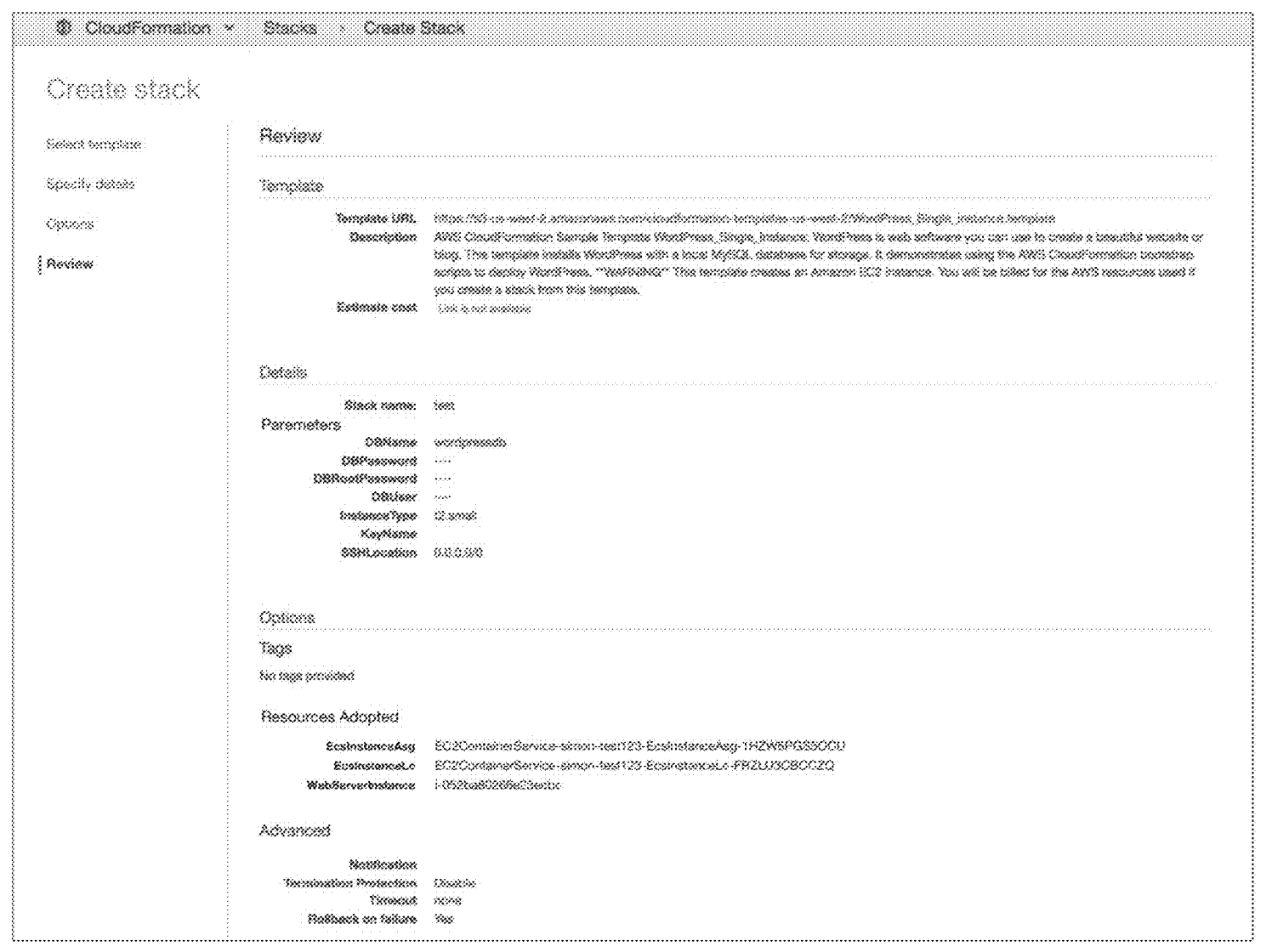

At step 656, the system may receive user input that identifies the stack template containing the definition of the stack to be instantiated. For example, the user may enter the template file name or select the template file name from a file system dialog box. At step 658, the system may obtain the stack template and then identify the ARDs within the template, as described above. Upon determining that the stack template includes at least one ARD, at step 660 the system may update the stack management interface to enable a resource adoption option selectable by the user. The resource adoption option may include data fields, drop-down menus, and other interactive elements that allow the user to enter identifying information for the candidate resources. For example, the user may enter at least the physical identifiers of the candidate resources to be adopted, and at step 662 the system may receive the user input comprising the physical identifiers. In some embodiments, the user may enter additional information, such as one or more context keys for disambiguating a target candidate resource from another virtual resource. For example, two virtual resources executing in different containers may have the same physical identifier; the user may include as a context key the container identifier for the container in which the target resource is executing. An example prompt in the stack management user interface 700 for entering context keys as key/value pairs is shown in FIG. 7C. In another example, the system may identify the candidate resources executing in the user's VCE(s), and may update the stack management interface to enable the user to view a representation of the candidate resources and input a selection of the target candidate resources to be adopted into the stack.

At step 664, the system may correlate the physical identifiers to the logical identifiers of the ARDs, as described above. In some embodiments, the user may enter the logical identifiers to facilitate this correlation. For example, the system may update the stack management interface to display pairs of logical identifier and physical identifier fields. If the physical identifiers were already selected, they may be displayed, and the user can type the corresponding logical identifier into the appropriate field. In some embodiments, the stack management interface may allow the user to only enter in the logical identifier field one of the valid logical identifiers in the first template; the physical identifier fields may be similarly limited. FIGS. 7A-B illustrate such an embodiment of a user interface 700. Once all of the logical identifiers are matched to a physical identifier, at step 670 the system may update the stack management interface to display a "details and confirmation" screen, such as is depicted in the user interface 700 of FIG. 7D, enabling the user to execute the stack management/resource adoption operation and/or to make changes to the user-supplied settings. If the system failed to match the logical identifiers with a physical identifier, at step 680 the system may update the stack management interface to indicate to the user that the template and/or user input was invalid.

Figure 8:
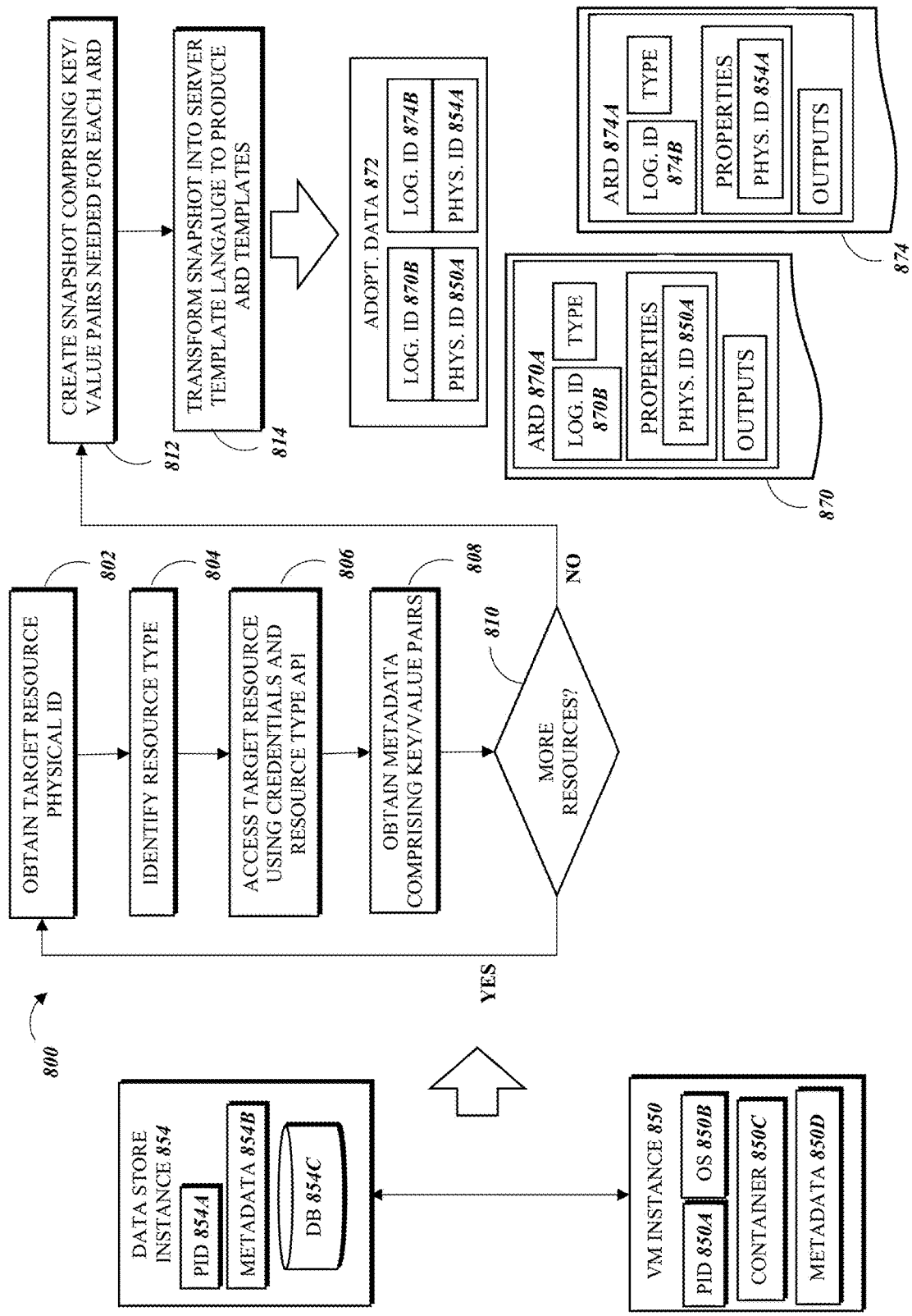
FIG. 8 is a diagram of an example method of generating adopted resource definitions for virtual computing resources, in accordance with the present disclosure.

FIG. 8 illustrates an example method 800 for automatically generating ARDs for candidate virtual resources executing in a user's VCE; the ARDs may be generated in a template language or format, such as JSON or YAML, used by servers of the computing resource service provider that are responsible for virtual resource allocation and/or management. In particular, the template language or format may conform to a schema or other framework for implementing IaC resources in the computing resource service provider's computing environment(s). The example method 800 produces templates 870, 874 that correspond to example virtual resource instances including a VM instance 850 and a data store instance 854. The example instances 850, 854 may have computing resource allocations and configuration as described above. The VM instance 850 may have a physical identifier 850A used to identify the resource itself within the VCE or other computing environment in which the VM instance 850 is executing; computing resources of the VM instance 850 may include an operating system 850B, one or more container instances 850C, such as a software container instance for executing a software program, and other computing resources. The VM instance 850 may include a virtual network interface for establishing network communications, or may attach or be attached to a dedicated or shared virtual network interface. The data store instance 854 may have a physical identifier 854A used to identify the resource itself within the VCE or other computing environment in which the data store instance 854 is executing; computing resources of the data store instance 854 may include one or more databases 854C and/or other logical storage volumes.

Each of the instances 850, 854 includes corresponding metadata 850D, 854B stored in or otherwise associated with the instance 850, 854. The metadata 850D, 854B may be generated when the instance is launched and/or during the instance's runtime, and may be based on the resource type, the launch and/or execution parameters, and the configuration of the resource, among other things. At least, the metadata 850D, 854B includes information describing the configuration of the corresponding instance 850, 854, which can be obtained by the system to generate the ARDs as described herein. In the illustrated example, the information is in the form of key/value pairs each representing a parameter of the resource configuration, but other forms of metadata are contemplated. Additionally, computing resources of an instance, such as VM instance 850, may themselves have metadata that the system obtains to describe the resource configuration. Moreover, in some embodiments such computing resources may have their own ARDs. For example, a container instance 850C may be represented by an ARD generated according to the method 800.

At step 802, the system may obtain the physical identifier of one of the target candidate resources. Examples of obtaining the physical identifier are provided above with respect to FIGS. 6A-B. In another example, the system may receive user input comprising a command entered into a command line interface; the command may include the physical identifiers 850A, 854A of one or more of the target resources as arguments. In some embodiments, the command may be an API call, such as a request to execute a snapshot API for generating a snapshot of the identifier virtual resource instances. At step 804, the system determines the resource type of the target resource. For example, the system may use the physical identifier obtained at step 802 to query the instance itself or a database or list of instance records executing in the VCE. In another example, the user may provide the resource type in a user interface or API call. At step 806, the system may obtain the appropriate resource API for the resource type and use the API to access the target resource. In some embodiments, the system may additionally need credentials or other security permissions to access the target resource, as described above.

At step 808, the system obtains the metadata needed to describe the resource configuration of the target resource. For example, the system may use the resource API to submit a request to the target resource that the target resource describe itself in a response message; the target resource may respond with a structured or unstructured document or data stream including the key/value pairs in its metadata that the target resource is configured to provide in response to the request. The system may store this data in a data store or in transitory memory as the rest of the target resource data is collected, or the system may begin to generate the snapshot by storing the key/value pairs in the snapshot format (step 812). At step 810, the system may determine whether there are more resources to include in the snapshot, and may return to step 802 if so.

If there are no more resources to include, at step 812 the system may create the snapshot of the target resources. In some embodiments, a snapshot is a structured data file containing the raw (i.e., obtained from the corresponding virtual resource instance and stored without modification) key/value pairs that describe the configuration parameters of each of the target resources. The snapshot may additionally include, for each target resource, the physical identifier of the target resource, associated with a logical identifier that will be used to identify the target resource within the template. The logical identifier may be generated by the system or provided by the user (e.g., as a command line argument when calling the snapshot API). The snapshot may be stored in a data store associated with the user until the snapshot is used to generate one or more templates or is deleted or replaced. At step 814, the system may transform the snapshot into one or more templates 870, 874 formatted for use by the appropriate server(s) and containing the ARD(s) of the target resource(s). In some embodiments, the system may automatically transform the snapshot once the snapshot is created. In other embodiments, the system may transform the snapshot in response to a request for the templates to be created. For example, the user may call a "compose template" API (e.g., from a console or command line interface) identifying the snapshot (e.g., using a snapshot identifier generated for the snapshot).

In some embodiments, the generated ARDs may be structured data files or records in a database, which can be imported by the user into a master template for the corresponding stack. In other embodiments, such as illustrated, the system may generate a complete template 870, 874 in program code that can be executed by the appropriate server(s). The system may produce a separate template 870, 874 for each of the target resources 850, 854, or may generate a single template containing the ARDs 870A, 874A of all of the target resources 850, 854. The system may additionally produce adoption data 872, which may be transitory structured metadata including records associating the corresponding logical identifier 870B, 874B of each ARD 870A, 874A with the corresponding physical identifier 850A, 854A of each virtual resource instance 850, 854, and optionally other data. Alternatively, a template 870, 874 may include the adoption data (i.e., logical/physical identifier association) for its adopted resource(s). An ARD 870A, 874A, as described above, includes the logical identifier 870B, 874B for identifying the target resource 850, 854 in the template 870, 874, and further includes the configuration parameters identified from the snapshot, such as the resource type, properties of the target resource, outputs of the target resource, mappings to logical volumes and/or block devices, descriptive parameters, and the like. In some embodiments, one of the properties of the ARD 870A, 874A may include the physical identifier 850A, 854A of the target resource 850, 854. An example adoption data object and template object produced in JSON format from a snapshot (e.g., in response to a compose template API call) of a VM instance is presented here:

```
{
    "AdoptionData": [
        {
            "PhysicalID": "i-0123456789abcd",
            "LogicalID": "AdoptedVM"
        }
    ],
    "TemplateBody": {
        "Description": "Composed by compose-template API",
        "Resources": {
            "AdoptedVM": {
```

-continued

```
                "Type": "VM::VM_subtype",
                "Properties": {
                    "Tag": {
                        "PhysicalID": " i-0123456789abcd"
                    },
                    "IPAddress": "202.52.91.104",
                    "Platform": "Linux",
                    "ImageID": "VM_Image_Identifier",
                    "AttributeDefinitions": [
                        {
                            "AttributeName": "myKey",
                            "AttributeType": "S"
                        }
                    ],
                }
            }
        }
    }
}
```

A template 870 for an ARD 870A may be a standalone file executed on its own or referenced in the master template, or the template 870 may be incorporated into the master template. For example, the system may present the template 870 in program code form in a user interface (e.g., the stack management interface described above), and may enable the user to copy the program code and paste the entire template 870 into the master template. In another example, the system may automatically, or in response to a request (e.g., a console or command-line call to an adopt resource API), insert the template 870 into the master template or append the template 870 to the master template, or may add a reference to the template 870 file into the master template. In some embodiments, the user or the system may copy the adoption data 872 with the rest of the template 870 into the master template, and the system may be configured to use the adoption data 872 to perform the adoption and then delete the adoption data 872 from the master template thereafter, so that the master template includes no adoption-specific data.

Figure 9:
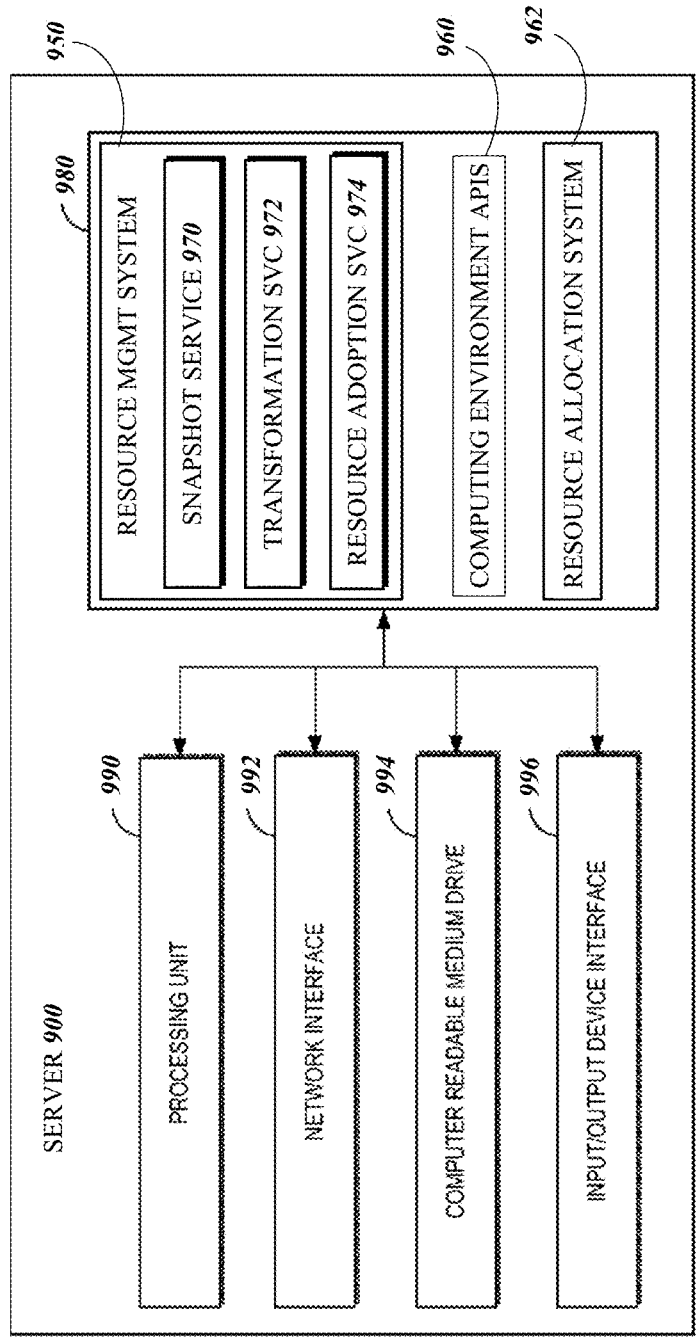
FIG. 9 is a diagram of a hardware computing device implementing the systems and methods of the present disclosure.

FIG. 9 depicts a general architecture of a computing system (referenced as server 900) that processes requests to allocate virtual computing resources to a user in a computing environment as described above. The general architecture of the server 900 includes an arrangement of computer hardware and software modules that may be used to implement aspects of the present disclosure. The hardware modules may be implemented with physical electronic devices, as discussed in greater detail below. The server 900 may include many more (or fewer) elements than those shown in FIG. 9. It is not necessary, however, that all of these generally conventional elements be shown in order to provide an enabling disclosure. Additionally, the general architecture illustrated in FIG. 9 may be used to implement one or more of the other components illustrated in the preceding Figures, including the resource allocation system, the security assessment system, and the network-accessible services system, each of which may be implemented in the same or a separate architecture from the others.

As illustrated, the server 900 includes a processing unit 990, a network interface 992, a computer readable medium drive 994, an input/output device interface 996, all of which may communicate with one another by way of a communication bus. The network interface 992 may provide connectivity to one or more networks or computing systems. The processing unit 990 may thus receive information and instructions from other computing systems or services via a communication network. The processing unit 990 may also communicate to and from memory 980 and further provide output information for an optional display (not shown) via the input/output device interface 996. The input/output device interface 996 may also accept input from an optional input device (not shown).

The memory 980 may contain computer program instructions (grouped as modules in some embodiments) that the processing unit 990 executes in order to implement one or more aspects of the present disclosure. The memory 980 generally includes RAM, ROM and/or other persistent, auxiliary or non-transitory computer-readable media. The memory 980 may include computer program instructions and other information for implementing aspects of the present disclosure. For example, in one embodiment, the memory 980 implements a resource management system 950, a resource allocation system 962, and a computing environment API 960 that may be executed by the processing unit 990 to enable the resource management system 950 to access and otherwise communicate with the network-accessible services systems described above. In addition, the memory 980 may include and/or communicate with one or more data repositories (not shown), for example, to access usage data, user data, a security model, security policies, and the like.

The resource management system 950 may include several services implemented in hardware, software, or a combination thereof, and communicating with various other services and with physical (e.g., hard drives) or virtual resources (e.g. logical drives) to obtain and analyze data according to the security check or other security assessment being performed. In some embodiments, a different service 970-974 may analyze each different type of data needed to perform the adoption tasks, although in other embodiments services may be consolidated, or unused if the corresponding type of data is not collected or analyzed. A client may authorize the services to access virtual resources associated with the client's user account, so that the services can obtain private and/or remote data.

In various examples, a snapshot service 970 may create snapshots of target resource configurations as described above. A transformation service 972 may modify templates for launching programmable computing infrastructure to include resource definitions for adopted virtual resources. The transformation service 972 may in some embodiments invoke the snapshot service 970 to generate a snapshot that the transformation service 972 uses to compose the resource definition in a format that can be incorporated into the template. A resource adoption service 974 may execute the adoption and detachment tasks, such as by modifying metadata and other data of executing resources, including a stack and/or one or more adopted resources.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system, comprising one or more processors and memory storing computer-executable instructions that, when executed by the one or more processors, cause the system to:
   receive a first request to perform a management operation on a logical container;
   determine that the management operation is to create the logical container in a virtual computing environment in which a first virtual resource instance is to be deployed;
   receive a first instance identifier of the first virtual resource instance and a further request to adopt the first virtual resource instance into the logical container;
   receive a second request to obtain a snapshot of a first virtual resource instance;
   obtain metadata associated with the first virtual resource instance;
   identify in the metadata a plurality of parameters having associated values and defining a first configuration of the first virtual resource instance;
   create the snapshot of the first virtual resource instance that includes a first logical identifier, the first instance identifier, and the plurality of parameters and the associated values;
   receive a third request to use the snapshot to compose a virtual resource definition for the first virtual resource instance;
   transform the snapshot into a first resource definition in a format of a first template;
   receive the first template defining the logical container and one or more virtual computing resources as members of the logical container, the first template including the first logical identifier;
   determine, based on one or both of the first request and the first template, that the first logical identifier is associated with the first instance identifier of the first virtual resource instance that is not instantiated from the first template;
   determine that the first template comprises program code readable by the one or more processors to define the logical container and to create and configure programmable computing infrastructure resources in the virtual computing environment;
   using the program code, communicate with a resource allocation system of the virtual computing environment to create the logical container and launch one or more computing resource instances associated with the logical container and representing the programmable computing infrastructure resources;
   associate the first instance identifier with the logical container and adopt the first virtual resource instance into the logical container based on the first instance identifier, enabling management of the first virtual resource instance as one of the one or more members of the logical container, without deleting the first virtual resource instance; and
   subsequent to adopting the first virtual resource instance into the logical container, apply requested management operations on the logical container in the virtual computing environment to the first virtual resource instance and the one or more computing resource instances.

2. The system of claim 1, the memory storing further computer-executable instructions that, when executed by the one or more processors, further cause the system to:
   identify, from a plurality of virtual resource instances associated with a user of a client computing device, one or more candidate resources that are not associated with the logical container, the one or more candidate resources including the first virtual resource instance;
   cause a user interface to be displayed on the client computing device, the user interface enabling the user to view a representation of the one or more candidate resources and input a selection of the one or more candidate resources to be adopted into the logical container; and
   receive the user input comprising the request and the selection including the first instance identifier.

3. The system of claim 1, the memory storing further computer-executable instructions that, when executed by the one or more processors, further cause the system to:
   determine that the management operation is to create the logical container in a virtual computing environment in which the first virtual resource instance is deployed;

determine that the first template comprises:
program code readable by the one or more processors to define the logical container in the virtual computing environment; and
a plurality of logical identifiers each associated with a corresponding virtual computing resource of the one or more virtual computing resources, the plurality of logical identifiers including the first logical identifier associated with the first virtual resource instance;
identify, based on one or both of the first request and the first template, a plurality of instance identifiers each associated with a corresponding logical identifier of the plurality of logical identifiers, each instance identifier identifying a corresponding target resource instance of a plurality of target resource instances that are executing in the virtual computing environment and are not instantiated from the first template, the plurality of target resource instances including the first virtual resource instance;
communicate with a resource allocation system of the virtual computing environment to create the logical container; and
associate the plurality of instance identifiers with the logical container to enable management of the plurality of target resource instances as the one or more members of the logical container, without deleting any of the plurality of target resource instances.

4. The system of claim 3, the memory storing further computer-executable instructions that, when executed by the one or more processors, further cause the system to:
obtain candidate information identifying each virtual resource instance executing in the virtual computing environment;
obtain container information identifying each virtual resource instance that is associated with one of the existing logical containers; and
before identifying the plurality of instance identifiers:
identify, as the plurality of target resource instances, each virtual resource instance identified in the candidate information and not identified in the container information; and
modify the first template to associate each logical identifier of the plurality of logical identifiers with a corresponding target resource instance of the plurality of target resource instances.

5. The system of claim 3, the memory storing further computer-executable instructions that, when executed by the one or more processors, further cause the system to:
determine that the first request identifies a target resource type of the one or more members of the logical container;
obtain candidate information identifying each virtual resource instance executing in the virtual computing environment;
obtain container information identifying each virtual resource instance that is associated with one of the existing logical containers;
identify, as one or more candidate resource instances, each virtual resource instance identified in the candidate information and not identified in the container information;
determine a corresponding resource type of each of the one or more candidate resource instances; and
before identifying the plurality of instance identifiers:
identify, as the plurality of target resource instances, each candidate resource instance, wherein the corresponding resource type is the target resource type; and
modify the first template to associate each logical identifier of the plurality of logical identifiers with a corresponding target resource instance of the plurality of target resource instances.

6. The system of claim 1, the memory storing further computer-executable instructions that, when executed by the one or more processors, further cause the system to:
determine that the management operation is to perform an update of the logical container, the one or more members of the logical container including a second virtual resource instance executing in a virtual computing environment in which the first virtual resource instance is deployed;
determine that the program code of the first template further includes a virtual resource definition used to launch the second virtual resource instance in the virtual computing environment;
obtain a primary identifier generated by a resource allocation system of the virtual computing environment upon creation of the logical container in the virtual computing environment; and
associate the first instance identifier with the primary identifier to adopt the first virtual resource instance into the logical container created in the virtual computing environment.

7. The system of claim 1, the memory storing further computer-executable instructions that, when executed by the one or more processors, further cause the system to, subsequent to adopting the first virtual resource instance into the logical container:
receive a request to detach adopted resources of the logical container;
determine, based on one or more of the request to detach, the first template, and metadata of the logical container created in a virtual computing environment in which the first virtual resource is deployed, that the first virtual resource instance is to be detached from the logical container;
remove the first logical identifier from the first template; and
to detach the first virtual resource instance from the logical container without deleting the first virtual resource instance, disassociate the first instance identifier and the logical container.

8. The system of claim 7, the memory storing further computer-executable instructions that, when executed by the one or more processors, further cause the system to:
determine that the request to detach adopted resources includes a request to adopt the first virtual resource instance into a second logical container; and
subsequent to detaching the first virtual resource instance from the logical container:
receive a second template defining the second logical container and including a second logical identifier; and
associate the first instance identifier with the second logical container to adopt the first virtual resource instance into the second logical container, enabling management of the first virtual resource instance as one of one or more members of the second logical container, without deleting the first virtual resource instance.

9. The system of claim 1, the memory storing further computer-executable instructions that, when executed by the one or more processors, further cause the system to, before associating the first instance identifier with the logical container:
obtain from the first template the program code comprising a first virtual resource definition associated with the first logical identifier and describing a first configuration of the first virtual resource instance;
using the first instance identifier, obtain metadata describing an actual configuration of the first virtual resource instance; and
compare the first configuration to the actual configuration to determine that the first virtual resource definition accurately defines the first virtual resource instance.

10. The system of claim 1, the memory storing further computer-executable instructions that, when executed by the one or more processors, further cause the system to:
receive the first instance identifier before or together with receiving the first request to perform the management operation on the logical container;
obtain metadata associated with the first virtual resource instance;
identify in the metadata a plurality of parameters having associated values and defining a first configuration of the first virtual resource instance; and
store the plurality of parameters, the first logical identifier, and the first instance identifier as a first resource definition in a format of the first template.

11. A system, comprising one or more server computing devices having one or more processors and memory storing specific computer-readable program instructions that, when executed by the one or more processors, cause the system to:
receive, from a client computing device in communication with the one or more server computing devices, user input comprising a request to perform a management operation on a logical container, wherein receiving the user input comprising the request comprises:
causing a user interface to be displayed on the client computing device, the user interface enabling the user to select an option to adopt a target resource into the logical container and to provide a selected logical identifier in a first field and a selected physical identifier in a second field;
receiving the user input comprising the request, the selected logical identifier, and the selected physical identifier;
determining that the selected logical identifier is a first logical identifier associated with a first physical identifier for adopting a resource; and
determining that the selected physical identifier is a first instance identifier of a first virtual resource instance, the user interface allowing the user to only enter in the first field one of one or more logical identifiers in a first template, and to only enter in the second field a corresponding instance identifier of one of a plurality of virtual resource instances associated with the user, the one or more logical identifiers including the first logical identifier and the plurality of virtual resource instances including the first virtual resource instance;
determine that the user input includes the first instance identifier and a first request to adopt the first virtual resource instance into the logical container;
determine that the user input includes a second request to obtain a snapshot of the first virtual resource instance;
obtain metadata associated with the first virtual resource instance;
identify in the metadata a plurality of parameters having associated values and defining a first configuration of the first virtual resource instance;
create the snapshot of the first virtual resource instance that includes the first logical identifier, the first instance identifier, and the plurality of parameters and the associated values;
determine that the user input includes a third request to use the snapshot to compose a virtual resource definition for the first virtual resource instance;
transform the snapshot into a first resource definition in a format of a first template;
receive the first template defining the logical container and one or more virtual computing resources associated with the logical container, the first template comprising the first logical identifier;
store the first instance identifier in the first template as the first physical identifier; and
perform the management operation to adopt the first virtual resource instance into the logical container based on the first instance identifier provided by the user input, and without deleting the first virtual resource instance.

12. The system of claim 11, the memory storing further computer-executable instructions that, when executed by the one or more processors, further cause the system to:
identify, from a plurality of virtual resource instances associated with a user of the client computing device, one or more candidate resources that are not associated with the logical container, the one or more candidate resources including the first virtual resource instance;
cause a user interface to be displayed on the client computing device, the user interface enabling the user to view a representation of the one or more candidate resources and input a selection of the one or more candidate resources to be adopted into the logical container; and
receive the user input comprising the request and the selection including the first instance identifier.

13. The system of claim 11, the memory storing further computer-executable instructions that, when executed by the one or more processors, further cause the system to:
determine that the management operation is to perform an update of the logical container, one or more members of the logical container including a second virtual resource instance executing in a virtual computing environment in which the first virtual resource instance is deployed;
determine that program code of the first template includes a virtual resource definition used to launch the second virtual resource instance in the virtual computing environment;
obtain a primary identifier generated by a resource allocation system of the virtual computing environment upon creation of the logical container in the virtual computing environment; and
associate the first instance identifier with the primary identifier to adopt the first virtual resource instance into the logical container created in the virtual computing environment.

14. The system of claim 13, the memory storing further computer-executable instructions that, when executed by the one or more processors, further cause the system to, subsequent to adopting the first virtual resource instance into the logical container:

receive a request to detach adopted resources of the logical container;
determine, based on one or more of the request to detach, the first template, and metadata of the logical container created in a virtual computing environment in which the first virtual resource is deployed, that the first virtual resource instance is to be detached from the logical container;
remove the first logical identifier from the first template; and
to detach the first virtual resource instance from the logical container without deleting the first virtual resource instance, disassociate the first instance identifier and the logical container.

15. The system of claim 11, the memory storing further computer-executable instructions that, when executed by the one or more processors, further cause the system to:
determine that the management operation is to create the logical container in a virtual computing environment in which the first virtual resource instance is deployed;
determine that the first template comprises program code readable by the one or more processors to define the logical container and to create and configure programmable computing infrastructure resources in the virtual computing environment;
using the program code, communicate with a resource allocation system of the virtual computing environment to create the logical container and launch one or more computing resource instances associated with the logical container and representing the programmable computing infrastructure resources; and
subsequent to adopting the first virtual resource instance into the logical container, apply requested management operations on the logical container in the virtual computing environment to the first virtual resource instance and the one or more computing resource instances.

16. A system, comprising one or more server computing devices having one or more processors and memory storing specific computer-readable program instructions that, when executed by the one or more processors, cause the system to:
receive, from a client computing device in communication with the one or more server computing devices, input comprising a request to perform a management operation on a logical container;
determine that the management operation is to create the logical container in a virtual computing environment in which a first virtual resource instance is to be deployed;
determine that the input includes a first instance identifier of the first virtual resource instance and a first request to adopt the first virtual resource instance into the logical container;
determine that the input includes a second request to obtain a snapshot of the first virtual resource instance;
obtain metadata associated with the first virtual resource instance;
identify in the metadata a plurality of parameters having associated values and defining a first configuration of the first virtual resource instance;
create the snapshot of the first virtual resource instance that includes the first logical identifier, the first instance identifier, and the plurality of parameters and the associated values;
determine that the input includes a third request to use the snapshot to compose a virtual resource definition for the first virtual resource instance;
transform the snapshot into a first resource definition in a format of a first template;
receive the first template defining the logical container and one or more virtual computing resources associated with the logical container, the first template comprising a first logical identifier associated with a first physical identifier for adopting a resource;
store the first instance identifier in the first template as the first physical identifier;
determine that the first template comprises program code readable by the one or more processors to define the logical container and to create and configure programmable computing infrastructure resources in the virtual computing environment;
using the program code, communicate with a resource allocation system of the virtual computing environment to create the logical container and launch one or more computing resource instances associated with the logical container and representing the programmable computing infrastructure resources;
perform the management operation by adopting the first virtual resource instance into the logical container based on the first instance identifier provided by the input, and without deleting the first virtual resource instance; and
subsequent to adopting the first virtual resource instance into the logical container, apply requested management operations on the logical container in the virtual computing environment to the first virtual resource instance and the one or more computing resource instances.

17. The system of claim 16, the memory storing further computer-executable instructions that, when executed by the one or more processors, further cause the system to:
identify, from a plurality of virtual resource instances associated with a user of the client computing device, one or more candidate resources that are not associated with the logical container, the one or more candidate resources including the first virtual resource instance;
cause a user interface to be displayed on the client computing device, the user interface enabling the user to view a representation of the one or more candidate resources and input a selection of the one or more candidate resources to be adopted into the logical container; and
receive the input comprising the request and the selection including the first instance identifier.

18. The system of claim 16, the memory storing further computer-executable instructions that, when executed by the one or more processors, further cause the system to receive the input comprising the request by:
causing a user interface to be displayed on the client computing device, the user interface enabling a user to select an option to adopt a target resource into the logical container and to provide a selected logical identifier and a selected physical identifier; and
receiving the input comprising the request, the selected logical identifier, and the selected physical identifier;
determining that the selected logical identifier is the first logical identifier; and
determining that the selected physical identifier is the first instance identifier.

19. The system of claim 18, the memory storing further computer-executable instructions that, when executed by the one or more processors, further cause the system to cause the user interface to enable the user to provide the selected logical identifier in a first field and to provide the selected physical identifier in a second field, the user interface allowing the user to only enter in the first field one of one or more logical identifiers in the first template, and to only enter in the second field a corresponding instance identifier of one of a plurality of virtual resource instances associated with the user, the one or more logical identifiers including the first logical identifier and the plurality of virtual resource instances including the first virtual resource instance.

20. The system of claim 16, the memory storing further computer-executable instructions that, when executed by the one or more processors, further cause the system to, subsequent to adopting the first virtual resource instance into the logical container:
- receive a request to detach adopted resources of the logical container;
- determine, based on one or more of the request to detach, the first template, and metadata of the logical container created in a virtual computing environment in which the first virtual resource is deployed, that the first virtual resource instance is to be detached from the logical container;
- remove the first logical identifier from the first template; and
- to detach the first virtual resource instance from the logical container without deleting the first virtual resource instance, disassociate the first instance identifier and the logical container.

\* \* \* \* \*